United States Patent
Nepomuceno et al.

(10) Patent No.: US 10,026,309 B1
(45) Date of Patent: Jul. 17, 2018

(54) NETWORKED VEHICLE CONTROL SYSTEMS TO FACILITATE SITUATIONAL AWARENESS OF VEHICLES

(71) Applicant: STATE FARM MUTUAL AUTOMOBILE INSURANCE COMPANY, Bloomington, IL (US)

(72) Inventors: John A. Nepomuceno, Bloomington, IL (US); Leo Chan, Normal, IL (US); Steven C. Cielocha, Bloomington, IL (US); Roxane Lyons, Chenoa, IL (US); Matthew S. Megyese, Bloomington, IL (US); William J. Leise, Normal, IL (US); Jennifer Criswell Kellett, Lincoln, IL (US); Kristopher Keith Gaudin, Bloomington, IL (US); Jennifer L. Crawford, Normal, IL (US); Jeremy Myers, Normal, IL (US); Edward P. Matesevac, III, Normal, IL (US); Rajiv C. Shah, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 15/482,524

(22) Filed: Apr. 7, 2017

Related U.S. Application Data

(60) Provisional application No. 62/400,215, filed on Sep. 27, 2016, provisional application No. 62/340,302, (Continued)

(51) Int. Cl.
*G08G 1/09* (2006.01)
*G08G 1/01* (2006.01)
(Continued)

(52) U.S. Cl.
CPC .............. *G08G 1/01* (2013.01); *G08B 21/06* (2013.01); *G08G 1/0962* (2013.01); (Continued)

(58) Field of Classification Search
CPC combination set(s) only.
See application file for complete search history.

(56) References Cited

U.S. PATENT DOCUMENTS

2013/0147638 A1* 6/2013 Ricci ........................ G06F 9/54
340/905
2013/0219318 A1* 8/2013 Schreiber ............... B60K 35/00
715/771
(Continued)

OTHER PUBLICATIONS

Fingas, Waze warns you about dangerous intersections in big US cities, downloaded from the Internet at: <https://www.engadget.com/2016/03/23/waze-warns-about-dangerous-intersections/> (Mar. 23, 2016).
(Continued)

*Primary Examiner* — Travis Hunnings
(74) *Attorney, Agent, or Firm* — Marshall, Gerstein & Borun LLP; Randall G. Rueth

(57) ABSTRACT

A system and method are provided for improving vehicle awareness and safety by generating and transmitting alerts in response to detecting a hazard in the environment omnidirectional to a vehicle awareness system. Omnidirectional environment data, representing kinematic information pertaining to one or more physically detectable elements omnidirectional to the primary vehicle, is acquired by one or more sensors communicatively coupled to ta vehicle. The system analyzes the omnidirectional environment data to detect if one or more hazards in the omnidirectional environment data, representing a change in the kinetic behavior of the one or more physically detectable elements omnidirectional to the vehicle awareness system, has occurred.
(Continued)

When the system detects one or more hazards in the omni-directional environment data, the system generates and transmits an alert to vehicles, vehicle operators, mobile devices, or pedestrians at risk from the hazard.

20 Claims, 7 Drawing Sheets

Related U.S. Application Data filed on May 23, 2016, provisional application No. 62/321,005, filed on Apr. 11, 2016, provisional application No. 62/321,010, filed on Apr. 11, 2016.

(51) Int. Cl.

| | | |
|---|---|---|
| *G08G 1/0967* | (2006.01) | |
| *G08G 1/00* | (2006.01) | |
| *G08G 1/0962* | (2006.01) | |
| *G08G 1/16* | (2006.01) | |
| *G08B 21/06* | (2006.01) | |

(52) U.S. Cl.
CPC . *G08G 1/096716* (2013.01); *G08G 1/096775* (2013.01); *G08G 1/096783* (2013.01); *G08G 1/166* (2013.01); *G08G 1/205* (2013.01); *B60W 2550/12* (2013.01); *B60W 2550/22* (2013.01)

(56) References Cited

U.S. PATENT DOCUMENTS

2017/0138108 A1* 5/2017 Kothari ................ E05F 15/40
2017/0218678 A1* 8/2017 Kothari ................ E05F 15/40

OTHER PUBLICATIONS

Highway Performance Monitoring System Traffic Data for High Volume Routes: Best Practices and Guidelines Final Report (Sep. 8, 2004).

Roadway Information Database (RID), Iowa State University, Center for Transportation Research and Education, downloaded from the Internet at: <http://www.ctre.iastate.edu/shrp2-rid/rid.cfm> (2014).

Sayed et al., Evaluating the Safety Benefits of the Insurance Corporation of British Columbia Road Improvement Program using a Full Bayes Approach, Transportation Research Board 2016 Annual Meeting (Nov. 15, 2015).

Shah, Accident Heat Map for Chicago (2015).

* cited by examiner

NETWORKED VEHICLE CONTROL SYSTEMS TO FACILITATE SITUATIONAL AWARENESS OF VEHICLES

CROSS REFERENCE TO RELATED APPLICATIONS

The present disclosure claims the benefit of U.S. Provisional Patent Application No. 62/321,005, entitled "Device for Detecting and Visualizing High-Risk Intersections and Other Areas" filed on Apr. 11, 2016; U.S. Provisional Patent Application No. 62/321,010, entitled "Analyzing Auto Claim and Vehicle Collision Data to Identify Hazardous Areas and Reduce Vehicle Collisions" filed on Apr. 11, 2016; and U.S. Provisional Patent Application No. 62/340,302, entitled "Analyzing Auto Claim and Vehicle Collision Data to Identify Hazardous Areas and Reduce Vehicle Collisions" filed May 23, 2016; and U.S. Provisional Patent Application No. 62/400,215, entitled "Networked Vehicle Control Systems to Facilitate Situational Awareness of Vehicles" filed Sep. 27, 2016, the disclosures of each of which is expressly incorporated by reference herein in its entirety.

TECHNICAL FIELD

The present disclosure relates generally to improving vehicle performance and safety. More particularly, the present disclosure relates to improving vehicle awareness by detecting one or more hazards in a vehicle's omnidirectional environment and initiating alerts in response to the hazards.

BACKGROUND

The proliferation of autonomous and semi-autonomous vehicles creates a new set of problems for other vehicles the roads. Many autonomous vehicles may be capable of carrying out an action without human input, often reacting in ways that differ from how human drivers typically react. Similarly, many vehicles may include semi-autonomous features, such as automatic braking, that cause them to behave unpredictably even if a human driver is usually in control. In either case, other drivers on the road may not be able to tell whether a vehicle is autonomous or semi-autonomous based solely on the car's appearance. Consequently, these other drivers may be unable to adequately prepare and respond to these unconventional behaviors. Therefore, there exists significant unpredictability and danger for people and property in the vicinity of autonomous and semi-autonomous vehicles. The present embodiments may overcome these and/or other deficiencies.

Additionally, all vehicles present a danger to pedestrians and individuals on or near the road when they change status. For example, a parked car is a risk to cyclists if one of its occupants unexpectedly opens a door in front of a cyclist and causes a collision. Similarly, a parked car is a risk to nearby pedestrians who may be injured if one of its occupants unexpectedly opens a door into them. As described above, the cyclists and nearby pedestrians often cannot tell whether a parked car has been parked for a long time and is thus not likely to have one of its doors opened, or if the car has just recently parked and is likely to have one of its doors opened. Therefore, there may exist significant unpredictability and danger for people in the vicinity of vehicles that have recently parked or otherwise changed their status. The present embodiments may overcome these and/or other deficiencies.

SUMMARY

The present embodiments disclose systems and methods that may relate to, inter alia, autonomous vehicle control and/or reacting to the behavior of an environment omnidirectional to an autonomous vehicle. Systems and methods may use omnidirectional environment data (such as vehicle collision data, mobile device data, telematics data, vehicle mounted-sensor or image data, autonomous vehicle sensor or image data, and/or smart infrastructure sensor or image data) and/or other data to detect a change in the environmental conditions surrounding a vehicle that requires a reaction in order to ensure safety of individuals and property. The omnidirectional environment data may be used to route or re-route autonomous vehicles, pedestrians, or bicyclists in response to detecting a hazard in the omnidirectional environment. The omnidirectional environment data may be used to generate alerts to human drivers, smart vehicles, pedestrians, bicyclists, and/or mobile devices. Further, wearable electronics may receive warnings from smart infrastructure of an approaching high risk and generate an audible, visual, or haptic alerts for operators.

Autonomous vehicle features may be engaged or disengaged depending upon whether the autonomous vehicle feature operates better than a manual driver given the type of reaction determined to be required as a response (such as exit ramp, on-ramp, circular traffic pattern, traffic light, road construction involving new daily traffic patterns/risks, high risk parking lot, etc.).

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Exemplary systems and methods for improving vehicle safety are described here. In accordance with a first exemplary aspect, a computer-implemented method for improving vehicle safety may be provided. The computer-implemented method may include: (1) acquiring, by one or more transceivers communicatively coupled to a vehicle awareness system, omnidirectional environment data from one or more transceivers, where the omnidirectional environment data represents kinetic information on one or more physically detectable elements omnidirectional to the vehicle awareness system, and where at least one of the one or more transceivers are not physically coupled to the vehicle awareness system; (2) analyzing, via one or more processors (such as processors associated with the vehicle awareness system), the omnidirectional environment data to detect one or more hazards in the omnidirectional environment data; (3) generating, via the one or more processors, an alert in response to detecting the one or more hazards; and (4) transmitting, via the one or more processors and/or transceivers, the alert to at least one alert device. The method may include additional, less, or alternate functionality, including that discussed elsewhere herein.

For instance, the one or more of the transceivers may be communicatively coupled to one or more peripheral vehicles (such as via wireless communication or data transmission over one or more radio frequency links or communication channels), where the one or more peripheral vehicles is adjacent to the primary vehicle. The one or more of the transceivers may also be communicatively coupled to one or more pedestrians, where the one or more pedestrians is adjacent to the primary vehicle. The one or more of the transceivers may also be communicatively coupled to one or more physical structures, where the one or more physical structures is adjacent to the primary vehicle.

The one or more hazards may indicate at least one of (1) an autonomous or semi-autonomous feature of a vehicle in the omnidirectional environment of the vehicle awareness system, (2) the current status of a vehicle in the omnidirectional environment of the vehicle awareness system, and (3) a change in the kinetic behavior of the one or more physically detectable elements omnidirectional to the vehicle awareness system. The current status of a vehicle in the omnidirectional environment of the primary vehicle may include the vehicle's doors have not been opened since it parked.

The at least one alert devices may include one of (1) an on-board computer coupled to the primary vehicle, (2) a mobile device associated with one or more of the occupants of a vehicle, and (3) a mobile device associated with one or more pedestrians. Generating an alert may also include selecting one or more of a visual alert, an audio alert, and a haptic alert.

Analyzing the omnidirectional environment data to detect one or more hazards further may include analyzing the kinematic information of a vehicle to generate a predicted route for the vehicle. The omnidirectional environment data may be acquired over a wireless network from a third-party.

In accordance with a second exemplary aspect of the invention, a computer system configured to improve vehicle safety may be provided. The computer system may include: (1) one or more transceivers, communicatively coupled to a vehicle awareness system, configured to acquire omnidirectional environment data, where the omnidirectional environment data represents kinetic information on one or more physically detectable elements omnidirectional to the vehicle awareness system, and where at least one of the one or more transceivers are not physically coupled to the vehicle awareness system; (2) one or more processors configured to analyze the omnidirectional environment data, where the one or more processors is configured to detect one or more hazards in the omnidirectional environment data; and (3) one or more alert systems configured to generate an alert in response to the one or more processors detecting the one or more hazards, and configured to transmit the alert to at least one alert device. The system may include additional, less, or alternate functionality, including that discussed elsewhere herein.

One or more of the transceivers may be communicatively coupled to one or more peripheral vehicles, where the one or more peripheral vehicles is adjacent to the primary vehicle. One or more of the transceivers may also be communicatively coupled to one or more pedestrians, where the one or more pedestrians is adjacent to the primary vehicle. One or more of the transceivers may also be communicatively coupled to one or more physical structures, where the one or more physical structures is adjacent to the primary vehicle.

The one or more hazards may indicate at least one of (1) an autonomous or semi-autonomous feature of a vehicle in the omnidirectional environment of the vehicle awareness system, (2) the current status of a vehicle in the omnidirectional environment of the vehicle awareness system, and (3) a change in the kinetic behavior of the one or more physically detectable elements omnidirectional to the vehicle awareness system. The current status of a vehicle in the omnidirectional environment of the primary vehicle may include the vehicle's doors have not been opened since it parked.

The alert devices may include one of (1) an on-board computer coupled to the primary vehicle, (2) a mobile device associated with one or more of the occupants of a vehicle, and (3) a mobile device associated with one or more pedestrians. The one or more alert systems may be further configured to generate an alert by selecting one or more of a visual alert, an audio alert, and a haptic alert.

The one or more processors may be further configured to analyze the omnidirectional environment data by analyzing the kinematic information of a vehicle to generate a predicted route for the vehicle. The one or more transceivers may acquire the omnidirectional data over a wireless network from a third-party.

BRIEF DESCRIPTION OF THE DRAWINGS

The drawings show examples of the presently discussed arrangements. However, the present embodiments are not limited to the precise arrangements and instrumentalities shown.

DETAILED DESCRIPTION

Figure 1A:
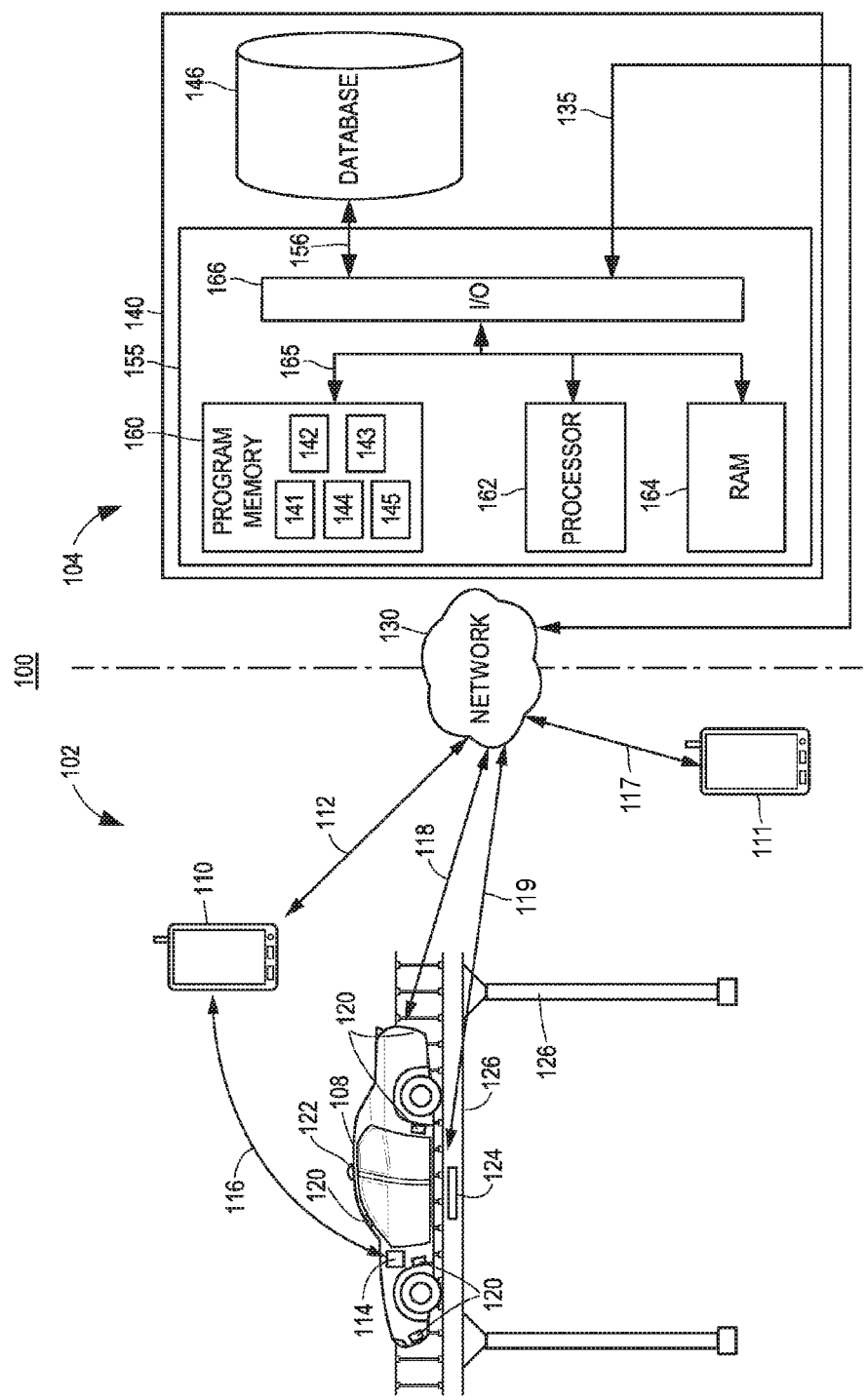
FIG. 1A illustrates a first embodiment of an exemplary vehicle awareness system configured to react to detecting hazards in the omnidirectional environment data representing the physically detectable elements omnidirectional to the vehicle awareness system.

A vehicle awareness system utilizes omnidirectional environment data to detect one or more hazards in the omnidirectional environment and generate one or more alerts in response to the detected hazards. The hazards in the omnidirectional environment may include vehicles with autonomous or semi-autonomous features, or any vehicle whose current status has changed (e.g., by parking). The alerts may be transmitted to individuals endangered by the hazard. These individuals may include nearby pedestrians, vehicle occupants, or other individuals on the roads (e.g., cyclists and skateboarders). The alerts may identify the hazard for alert recipients so they can take actions to avoid or otherwise mitigate the hazard's danger.

The alerts may come as any combination of audio, visual, or haptic stimuli. For example, generating and transmitting an alert may include an audio tone or voice reciting the nature and/or location of the hazard. As another example, generating and transmitting an alert may include displaying text, an image, a video, a map, traffic flow, a current view of the vehicle awareness system's omnidirectional environment, or other visual stimuli. Generating and transmitting an alert may also include vibrations or other haptic feedback on a mobile device, electronic wearable, steering wheel, seat, vehicle center console, foot rest, arm rest, head rest, parking break, shifter, clutch, or other physical component of a vehicle. In some embodiments, the alerts may include information on the nature of the hazard, the location of the hazard, or suggested actions to avoid the hazard and any danger it presents.

More specifically, the vehicle awareness system may receive omnidirectional environment data from one or more transceivers. The omnidirectional environment of the vehicle awareness system is the one or more physical elements in at least one direction adjacent to the vehicle awareness system. The omnidirectional environment may include any physically detectable element located to the left, right, in front of, behind, beneath or above the vehicle awareness system. In some embodiments, the omnidirectional environment includes the geographic area surrounding a moving or parked vehicle. The omnidirectional environment may also include physical structures. For example, the omnidirectional environment may include a building, roadway, fencing enclosure, streetlight, street sign, stoplight, traffic control device, sculpture, parking meter, parking space, overhang, toll station, bridge, ramp, or other fixed physical element.

The omnidirectional environment data may include information corresponding to one or more vehicles in the vehicle awareness system's omnidirectional environment. For example, the omnidirectional environment data may include the semi-autonomous or autonomous features available on the vehicles, whether those semi-autonomous or autonomous features are engaged or disengaged, the locations of the vehicles, the planned or predicted routes of the vehicles, current status of the vehicles, whether the vehicles have occupants, or vehicle kinetic information. The omnidirectional environment data may also include information corresponding to one or more structures or pieces of infrastructure in the vehicle's omnidirectional environment. For example, the omnidirectional environment data may include data from one or more pieces of smart infrastructure, information on the locations of road infrastructure (e.g., traffic lights, crosswalks, stop signs, bike lanes, one-way streets, or parking spaces). Lastly, the omnidirectional environment data may include information on the on the environmental conditions in the vehicle awareness system's omnidirectional environment (e.g., weather, traffic, or road conditions).

In some embodiments the vehicle is an automobile, motorcycle, boat, airplane, bicycle, skateboard, Segway®, scooter, rollerblades, self-balancing hover board, or other machine operated by a user to travel.

The transceivers include one or more transceivers located omnidirectional to the vehicle awareness system. The transceivers may be physically or wirelessly coupled to a vehicle, a physical structure, or a pedestrian. In some embodiments, the transceivers may include one or more sensors. These sensors may include one or more of a GPS unit, a radar unit, a LIDAR unit, an ultrasonic sensor, an infrared sensor, an inductance sensor, a camera, an accelerometer, a gyroscope, a tachometer, a speedometer, a camera, a magnetometer, a barometer, a thermometer, a proximity sensor, a light sensor, or a Hall Effect sensor. The sensors may be positioned to determine telematics data regarding the speed, force, heading, and/or direction associated with movements of the vehicles.

In some embodiments, kinetic information includes, but is not limited to, a vehicle's current and previous speed, acceleration, braking tendencies and behavior, intended route, typical routes, lane changing behavior, tendency to exceed the speed limit, average amount by which the speed limit is exceeded, adherence to road lanes, tendency to drift into lanes, frequency of sudden stops, conditions of previous vehicle collisions, frequency of being pulled over by police, conditions under which a vehicle or its operator was pulled over by the police, engaging turning signals, engaging windshield wipers, overall vehicle movement, or any other behavior associate with vehicle operation. The data associated with vehicle operation may include vehicle speed information of surrounding vehicles, following or average following distance information of one or more surrounding vehicles, braking information associated with one or more surrounding vehicles, and/or acceleration information associated with one or more surrounding vehicles. Additionally or alternatively, the data associated with surrounding vehicle operation may include data generated by one or more surrounding vehicles or smart infrastructure, and received via wireless communication broadcast over one or more radio links or wireless communication channels.

In some embodiments, alert devices may include a vehicle dashboard or heads-up display (HUD); a mobile device operated by the vehicle operator or passenger, a neighboring vehicle operator or passenger, or other nearby individual (such as a pedestrian or a cyclist); a computer located within or outside of a vehicle; automotive peripherals (such as vehicle seats, steering wheel or speakers); or any other device capable of alerting individuals within or nearby the vehicle. Alert devices may issue an alert a hazard is detected in the omnidirectional environment data. These alerts may come in the form of visual alerts on a display screen (such as the display screen of a car dashboard or HUD, mobile device, or a computer), audio alerts played through speakers (such as the speakers of a mobile device, car stereo, headphones, or attached to a computer), or haptic alerts from a haptic transducer (such as vibrations in a mobile device, steering wheel, or vehicle seat). These alerts may inform or otherwise warn alert recipients of potential or immediate dangers. After receiving the alert, the alert recipient may take corrective action to avoid the danger.

FIG. 1A depicts a first embodiment of an exemplary vehicle awareness system 100. The vehicle awareness system 100 may include vehicle-based components 102, server-based components 104, and an alert device 111. The vehicle-based components 102 may include a vehicle 108 and a mobile device 110. The vehicle-based components 102 may be disposed within or communicatively connected to one or more on-board computers 114, which may be permanently or removably installed in the vehicle 108. The on-board computer 114 may interface with one or more sensors 120 within the vehicle 108, which may also be incorporated within or connected to the on-board computer 114.

The mobile device 110 or the alert device 111 may be interfaced as a general-use personal computer, cellular phone, smart phone, tablet computer, smart watch, wearable electronics, vehicle navigation device, or a dedicated vehicle monitoring or control device. Further, the on-board computer 114 may be originally installed by the manufacturer of the vehicle 108, or installed as an aftermarket modification or addition to the vehicle 108. In some embodiments or under certain conditions, the mobile device 110, the alert device 111, or on-board computer 114 (or smart home controller) may function as thin-client devices that outsource some or most of the processing to the server 140.

The sensors 120 may be removably or fixedly installed within the vehicle 108 and may be disposed in various arrangements to provide information generation and collection of customer data, and/or to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, a speedometer, or other sensors as described here. Some of the sensors 120 (e.g., radar, LIDAR, or camera units) may actively or passively scan the vehicle environment for obstacles (e.g., other vehicles, buildings, pedestrians, roadways, lane markings, or signs). Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 as discussed here.

The sensors 120 may be communicatively coupled to a vehicle transceiver 122, which sends and receives omnidirectional environment data. For example, the vehicle transceiver 122 may send vehicle kinetic information about the vehicle 108 over the network 130 via link 118. This information may then be used to identify the vehicle 108's current position or predict its future position. The current or predicted position may be useful when generating an alert because it would enable the vehicle awareness system 100 to only send the alert to alert devices near one of those positions. As another example, the vehicle transceiver may receive omnidirectional environment data from other vehicles. These other vehicles may also be equipped with vehicle transceivers such as vehicle transceiver 122. The omnidirectional environment data from the other vehicles may indicate that one or more of these vehicles is equipped with autonomous or semi-autonomous features and that one of more of these features are enabled. Using this information, the vehicle awareness system may generate an alert for the operator of vehicle 108 warning them of the enabled autonomous or semi-autonomous features. This alert may then help the operator prepare for the potentially different behavior of the autonomous or semi-autonomous vehicle.

Similarly, a structural transceiver 124 may be communicatively connected to one or more sensors (not shown) for detecting information relating to the condition of the infrastructure component 126. The sensors may also generate data relating to weather conditions, traffic conditions, or the operating status of the infrastructure component 126. The structural transceiver 124 coupled to a physical structure may be configured to receive the sensor data generated and determine a condition of the infrastructure component 126, such as weather conditions, road integrity, construction, traffic, available parking spaces. The structural transceiver 124 may further be configured to communicate information to vehicles 108 via the vehicle transceiver 122 or via link 119 and the network 130. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or directly or indirectly communicate information to other vehicles 108 and/or to mobile devices 110.

The server-based components 104 may include a server 140, a database 146 and a controller 155 connected to the database via a link 156. The controller may also be connected to the network 130 via link 135. It should be noted that, while not shown, additional databases may be linked to the controller 155 in a known manner. For example, separate databases may be used for various types of information, such as customer mobile device or vehicle location information, tracking autonomous vehicle location, vehicle collisions, road conditions, road construction, vehicle insurance policy information or vehicle use or maintenance information.

Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memory 160 may be implemented as semiconductor memories, magnetically readable memories, or optically readable memories, for example. The controller 155 may also be operatively connected to the network 130 via a link 135. The I/O may connect the program memory 160, the processor 162, and the RAM 164 to the database 146 and the network 130 by the links 165, 156, and 135.

The server 140 may further include a number of software applications stored in a program memory 160. The various software applications on the server 140 may include an autonomous and semi-autonomous operation information monitoring application for receiving information regarding the vehicle 108 and its autonomous and semi-autonomous operation features. The autonomous and semi-autonomous operation information monitoring application may also monitor whether the autonomous and semi-autonomous features of the vehicle 108 are enabled. The server 140 may also include a route prediction application that predicts routes of vehicles based upon one or more of that vehicle's current kinetic information, that vehicle's current position, that vehicle's past driving habits (which may be derived from previously-received omnidirectional environment data), and other vehicle's past driving habits. Predicted vehicle routes may be useful for predicting the vehicle 108's future position, which, as discussed above, may be useful in identifying hazards and generating alerts.

The server 140 may also include a vehicle status monitoring application that monitors the current status of a vehicle and/or whether that status has recently changed. Monitored vehicle statuses may include whether the vehicle is parked, whether the vehicle is still occupied, whether the vehicle's doors have recently been opened, and whether the vehicle is likely to leave its parking spot soon. The vehicle status monitoring application may receive vehicle status information from the vehicle itself, or it may predict the vehicle status based upon other information received from the vehicle. For example, the vehicle 108 may include a sensor that detects when it has parked and may send this information with the vehicle transceiver 122 via the link 118 and the network 130 to the server 140. The vehicle 108 may also detect whether its doors have opened yet and send that information in the same way. The vehicle status monitoring application may then determine based upon this omnidirectional environment data that the car has parked and the doors have not opened yet.

In another example, the vehicle 108 may only have sensors that monitor its current location and may send that information with the vehicle transceiver 122 via the link 118 and the network 130 to the server 140. In this instance, the vehicle status monitoring application may have to predict that the vehicle has parked recently based upon whether its location has changed in a certain period of time (e.g., if a vehicle's location has stopped changing for 30 seconds or more it has probably parked). In either example, this information may be useful in generating alerts for nearby vehicles or pedestrians (e.g., cyclists), warning them that a nearby car door may open soon.

The server 140 may also include an alert generation application that generates alerts based upon the received omnidirectional environment data. The alert generation application may analyze the omnidirectional environment data to detect one or more hazards in the omnidirectional environment. These hazards may include a nearby vehicle engaging or operating under one or more of its autonomous or semi-autonomous features, the current status or a change in the current status of a nearby vehicle, or a change in the kinetic behavior of one or more physically detectable elements in the omnidirectional environment. As discussed above, the alert generation application may receive information indicating whether a nearby vehicle has autonomous or semi-autonomous features and whether those features are enabled. If a vehicle in the vehicle awareness system's omnidirectional environment is operating under one of these features or engages one of these features, it could present a risk to nearby vehicles and pedestrians. Accordingly, the alert generation application may generate an alert in response to detecting this hazard and transmit it to one or more alert devices near the autonomous or semi-autonomous vehicle. These individuals may then be alerted to this hazard and may take actions to avoid the dangers it presents.

Similarly, as discussed above, the alert generation application may receive information that a vehicle has recently parked, but has not yet opened its doors. If one of the vehicle's occupants suddenly opens the door, it could pose a collision risk for nearby vehicles and cyclists, as well as an injury risk for nearby pedestrians. In response to detecting this hazard, the alert generation application may generate an alert and transmit it to one or more alert devices near the recently parked vehicle, enabling those who receive the alert to avoid the hazard. The alert generation application may transmit the alert to one or more alert devices, such as alert device 111.

The alert device 111 may receive alerts generated in response to detecting one or more hazards in the vehicle awareness system's omnidirectional environment. These alerts may be generated by an alert generation application, such as the alert generation application of server 140. The alert device 111 may receive the alerts via the network 130 and link 117. The alerts may be any combination of visual alerts, audio alerts, and haptic alerts. As described above, the alert device may be implemented as a mobile device, or may be an onboard computer, such as on-board computer 114. In some embodiments, mobile device 110 and/or on-board computer 114 may implement some or all of the functions of the alert device 111, in which case no separate implementation may be required.

In some embodiments, the vehicle-based components 102 receive data, such as omnidirectional environment data, or alerts, such as those generated by the alert generation application, from the server 140 over the network 130. The vehicle-based components 102 may receive this data via the mobile device 110 and the link 112 or via the vehicle transceiver 122 and the link 118. The server 140 may also perform some or all of the functions of the vehicle-based components 102. In other embodiments, the on-board computer 114 may perform all of the functions of the mobile device 110 described here, in which case no separate mobile device 110 may be present in the vehicle awareness system 100. Either or both of the mobile device 110 or on-board computer 114 (and/or a smart home controller, sensor, or processor) may communicate with the network 130 over links 112 and 118, respectively. In some embodiments, the vehicle-based components 102 (such as mobile devices, smart vehicles, smart homes, or other customer computers) communicate data (including the customer data discussed here) with the server-based components 104 via the network 130.

The network 130 may be a proprietary network, a secure public Internet, a virtual private network or some other type of network, such as dedicated access lines, plain ordinary telephone lines, satellite links, cellular data networks, or combinations of these. The network 130 may include one or more radio frequency communication links, such as wireless communication links 112 and 118 with mobile devices 110 and on-board computers 114 (and/or smart home controllers), respectively. Where the network 130 comprises the Internet, data communications may take place over the network 130 via an Internet communication protocol.

Although the system 100 is shown to include one vehicle 108, one mobile device 110, one on-board computer 114, one alert device 111 and one server 140, it should be understood that different numbers of vehicles 108, mobile devices 110, on-board computers 114, alert devices 111 and/or servers 140 may be utilized, including interconnected home or smart infrastructure (e.g., smart sign, road marker, bridge, road, or traffic light) processors and/or transceivers. For example, the system 100 may include a plurality of servers 140 and hundreds of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information, as well as periodic uploads and downloads of information. This may in turn support a thin-client embodiment of the mobile device 110 or on-board computer 114 discussed here.

Figure 1B:
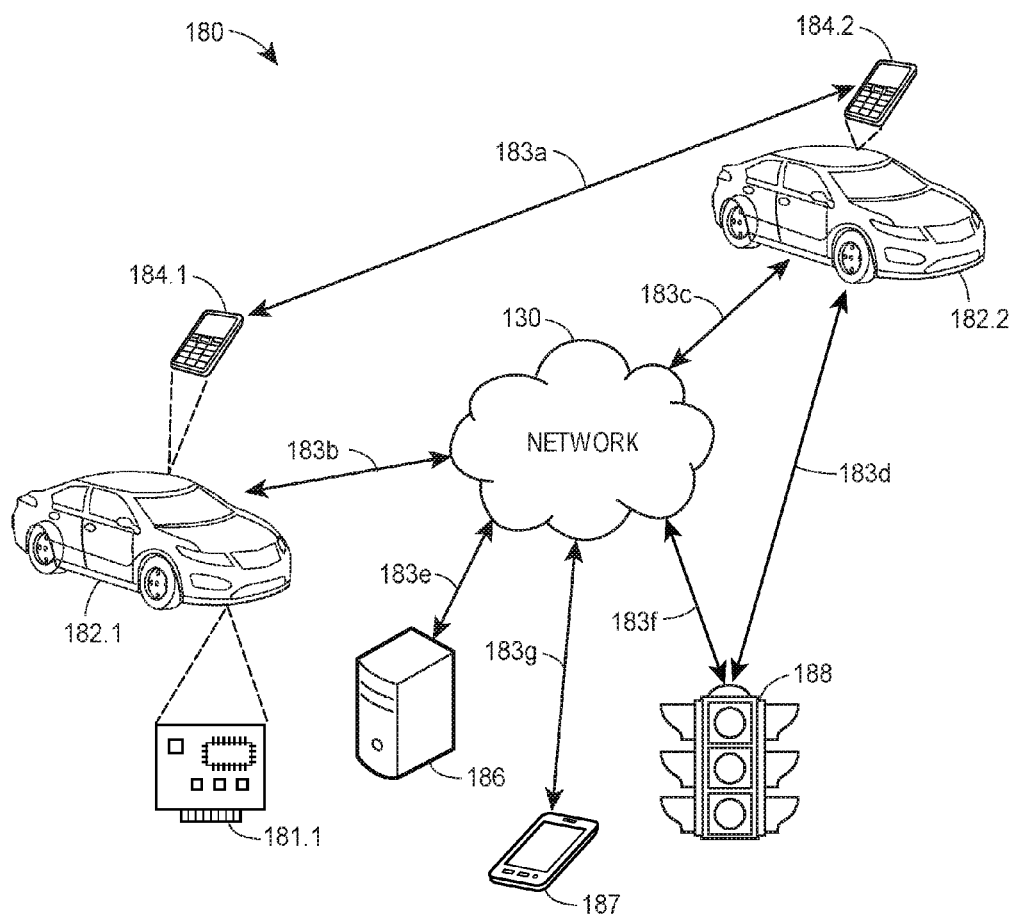
FIG. 1B illustrates a second embodiment of an exemplary vehicle awareness system configured to react to detecting hazards in the omnidirectional environment data representing the physically detectable elements omnidirectional to the vehicle awareness system.

FIG. 1B depicts another embodiment of an interconnected vehicle awareness system 180 on which the exemplary methods described here may be implemented. In one aspect, vehicle awareness system 180 may include a network 130, N number of vehicles 182.1-182.N and respective mobile computing devices 184.1-184.N, an external computing device 186 (such as home computing device, or smart home controller), and/or a smart infrastructure component 188. In one aspect, mobile computing devices 184 may be an implementation of mobile computing device 110, while each vehicle 182 may be an implementation of vehicle 108, including autonomous, semi-autonomous, or non-autonomous vehicles. The vehicles 182 may include a plurality of vehicles 108 having autonomous or semi-autonomous operation features, as well as a plurality of other non-autonomous vehicles. The interconnected vehicle awareness system 180 may also include an alert device 187, which may be an implementation of the alert device 111.

As illustrated, the vehicle 182.1 may include a vehicle controller 181.1, which may be an on-board computer 114 as discussed elsewhere, while vehicle 182.2 may lack such component. Each of vehicles 182.1 and 182.2 may be configured for wireless inter-vehicle communication, such as V2V or peer-to-peer wireless communication and/or data transmission via the vehicle transceiver 122, directly via the mobile computing devices 184, or otherwise.

Although the interconnected vehicle awareness system 180 is shown in FIG. 1B as including one network 130, two mobile computing devices 184.1 and 184.2, two vehicles 182.1 and 182.2, one external computing device 186, one alert device 187 and/or one smart infrastructure component 188, various embodiments of interconnected vehicle awareness system 180 may include any suitable number of networks 130, mobile computing devices 184, vehicles 182, external (including home) computing devices 186, and/or infrastructure components 188. The vehicles 182 included in such embodiments may include any number of vehicles 182.i having vehicles controllers 181.n (such as vehicle 182.1 having vehicle controller 181.1) and vehicles 182.j not having vehicle controllers (such as vehicle 182.2). Moreover, interconnected vehicle awareness system 180 may include a plurality of external (and/or home) computing devices 186 and more than two mobile computing devices 184 configured to collect and generate customer data (such as customer presence or location information, mobile device and vehicle sensor data, and/or other types of customer data), any suitable number of which being interconnected directly to one another and/or via network 130.

Each of mobile computing devices 184.1 and 184.2 may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183a, which may utilize a Wi-Fi direct protocol, an ad-hoc cellular communication protocol, or peer-to-peer (P2P) wireless communication. Mobile computing devices 184.1 and 184.2 may also be configured to communicate with vehicles 182.1 and 182.2, respectively, utilizing a BLUETOOTH® or other wired or wireless communication protocol (link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

In one aspect, each of mobile computing devices 184.1 and 184.2 may be configured to communicate with one another directly via peer-to-peer (P2P) wireless communication and/or data transfer. In other aspects, each of mobile computing devices 184.1 and 184.2 may be configured to communicate indirectly with one another and/or any suitable device via communications over network 130, such as external computing device 186 (such as insurance or financial services provider remote servers, or a smart home controller), and/or smart infrastructure component(s) 188, for example. In still other aspects, each of mobile computing devices 184.1 and 184.2 may be configured to communicate directly and/or indirectly with other suitable devices, such as remote servers configured to collect and analyze customer data (including auto insurance claim and/or vehicle collision data) to generate customer alerts, which may include synchronous or asynchronous communication.

Mobile computing devices 184.1 and 184.2 may be configured to execute one or more algorithms, programs, applications, etc., and act as at least a partial implementation of the interconnected vehicle awareness system 180. For example, the mobile computing devices 184.1 and 184.2 may be configured to determine a geographic location of each respective mobile computing device (and thus their associated vehicle), to generate, measure, monitor, and/or collect one or more sensor metrics as GPS or telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alerts to other computing devices.

Such functionality may, in some embodiments be controlled in whole or part by a Data Application operating on the mobile computing devices 184, as discussed elsewhere. Such Data Applications may communicate between the mobile computing devices 184 and one or more external computing devices 186 (such as server 140) to facilitate centralized data collection and/or processing. The Data Application may also be an implementation of the autonomous and semi-autonomous operation information monitoring application, the route prediction application, the vehicle status monitoring application or the alert generation application as described above.

In some embodiments, the Data Application may also facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor mobile device or vehicle operation or mobile device, vehicle, wearable electronic device, or home sensor data in real-time to make recommendations or for other purposes as described elsewhere. The Data Application may further facilitate monitoring and/or assessment of the vehicle 182, such as by evaluating operating data to determine the condition of the vehicle or components thereof (e.g., sensors or autonomous operation features).

External computing device 186 may be configured to execute various software applications, algorithms, and/or other suitable programs. External computing device 186 may be implemented as any suitable type of device to facilitate the functionality as described here. For example, external computing device 186 may be a server 140, as discussed elsewhere. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g., cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1). For example, mobile computing device 184.1 and/or 184.2 may collect omnidirectional environment data as described elsewhere, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions, such as initiating a vehicular reaction. The external computing device 186 may also include implementations of the autonomous and semi-autonomous operation information monitoring application, the route prediction application, the vehicle status monitoring application or the alert generation application as described above.

In one aspect, external computing device 186 may additionally or alternatively be part of an insurer computing system (or facilitate communications with an insurer computer system), and as such may access insurer databases, execute algorithms, execute applications, access remote servers, and communicate with remote processors as needed to perform insurance-related functions. In aspects in which external computing device 186 facilitates communications with an insurer computing system (or is part of such a system), data received from one or more mobile computing devices 184.1-184.N may include user credentials, which may be verified by external computing device 186 or one or more other external computing devices, servers, etc. These user credentials may be associated with an insurance profile, which may include, for example, financial account information, insurance policy numbers, a description and/or listing of insured assets, vehicle identification numbers of insured vehicles, addresses of insured structures, contact information, premium rates, discounts, or other insurance information. In this way, data received from one or more mobile computing devices 184.1-184.N may allow external computing device 186 to uniquely identify each insured customer and/or whether each identified insurance customer has installed the Data Application.

In some aspects, external computing device 186 may facilitate indirect communications between one or more of the mobile computing devices 184, vehicles 182, smart home controllers, wearable electronic devices, and/or smart infrastructure components 188 via network 130 or another suitable communication network, wireless communication channel, and/or wireless link. For example, the external computing device 186 may receive vehicle status or omnidirectional environment data from the vehicle 182.1 and convey the omnidirectional environment data to vehicle 182.2. In this way, the two vehicles need not rely exclusively on V2V or other direct communication connections between one another, which may be less reliable than network 130.

Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a smart traffic light, a smart road, a smart railroad crossing signal, a smart construction notification sign, a roadside display configured to display messages, a billboard display, a smart bridge, a smart ramp, a smart sign, a parking garage monitoring device, a smart parking lot equipped for wireless communication or data transmission, etc.

Figure 2:
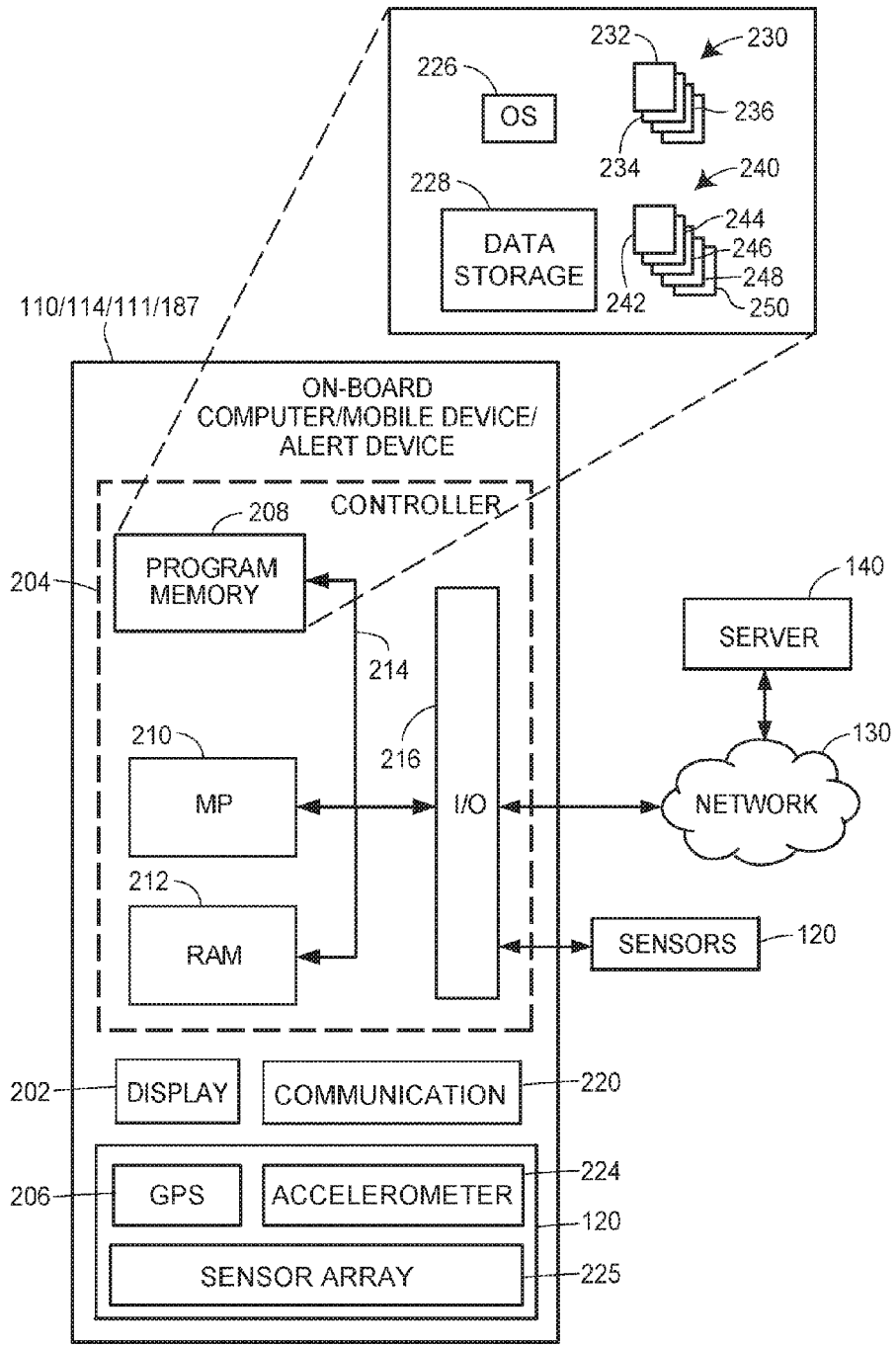
FIG. 2 illustrates one embodiment of an exemplary on-board computer, mobile device, and/or alert device.

FIG. 2 illustrates a block diagram of an exemplary mobile device 110 or an exemplary on-board computer 114 (and/or smart home controller) or an alert device 111/187 consistent with the vehicle awareness systems 100 and 180. The mobile device 110 or on-board computer 114 (and/or smart home controller) may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 (and/or smart home controller) may be integrated into a single device, or either may perform the functions of both. The on-board computer 114 (or mobile device 110) interfaces with the sensors 120 to receive information regarding the vehicle 108 and its environment, and which information is used by the autonomous operation features to operate the vehicle 108.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to road navigation and/or the autonomous operation features. In some embodiments, the controller 204 may also include, or otherwise be communicatively connected to, other data storage mechanisms (e.g., one or more hard disk drives, optical storage drives, or solid state storage devices) that reside within the vehicle 108.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. The plurality of applications may include one or more implementations of the autonomous and semi-autonomous operation information monitoring application, the route prediction application, the vehicle status monitoring application or the alert generation application as described above. Another application of the plurality of applications 230 may include an autonomous operation monitoring application 236 that may be implemented as a series of machine-readable instructions for sending information regarding autonomous operation of the vehicle to the server 140 via the network 130. Still another application of the plurality of applications may include an alert initiation application that may be implemented as a series of machine-readable instructions for initiation one or more of a visual, audio, or haptic alert generated by the vehicle awareness system 100/180 (such as by the alert generation application). Lastly, one of the plurality of applications 230 may be an autonomous vehicle operation application 232 that may be implemented as a series of machine-readable instructions for performing the various tasks associated with implementing one or more of the autonomous operation features.

The plurality of software applications 230 may call one or more of the plurality of software routines 240 to perform functions relating to autonomous or semi-autonomous vehicle operation, monitoring, or communication. One of the plurality of software routines 240 may be a configuration routine 242 to receive settings from the vehicle operator to detect the operating parameters of an autonomous or semi-autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, or speed control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle operation to the server 140 via the network 130. Yet another of the plurality of software routines 240 may be an autonomous communication routine 250 for receiving and transmitting information between the vehicle 108 and external sources to improve the effectiveness of the autonomous operation features. Still further, one of the plurality of software routines 240 may be an omnidirectional environment data receiving routine that receives omnidirectional environment data from one or more of another vehicle or the server 140 via the network 130 or the vehicle transceiver 122. Any of the plurality of software applications 230 may be designed to operate independently of the software applications 230 or in conjunction with the software applications 230.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for alert generation, autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, radar units, etc. The one or more sensors of the sensor array 225 may be positioned to determine telematics data regarding the speed, force, heading, and/or direction associated with movements of the vehicle 108. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network discussed here, such as wireless telephony (e.g., GSM, CDMA, LTE, etc.), Wi-Fi (802.11 standards), WiMAX, Bluetooth®, infrared or other radio frequency communication.

Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140. In some embodiments, the communication unit may be an implementation of the vehicle transceiver 122.

The mobile device 110 or the on-board computer 114 may include a user-input device (not shown) for receiving instructions or information from the vehicle operator, such as settings relating to an autonomous operation feature. The user-input device (not shown) may include a "soft" keyboard that is displayed on the display 202, an external hardware keyboard communicating via a wired or a wireless connection (e.g., a Bluetooth® keyboard), an external mouse, a microphone, or any other suitable user-input device. The user-input device (not shown) may also include a microphone capable of receiving user voice input.

Figure 4:
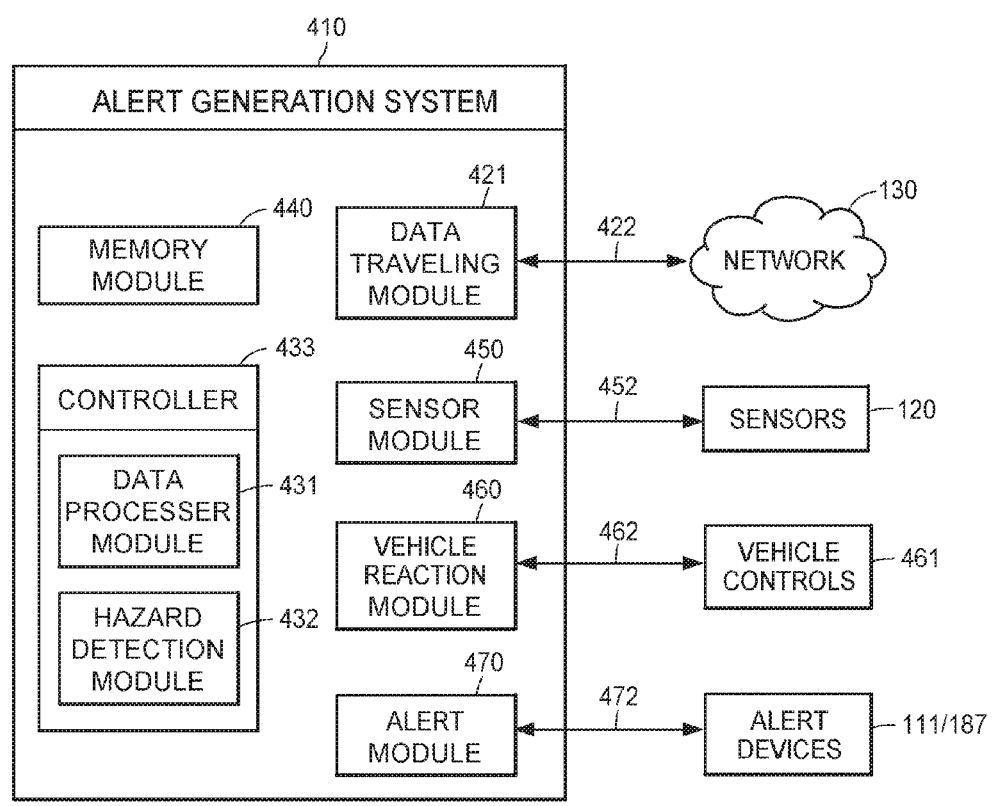
FIG. 4 illustrates a block diagram of an exemplary alert generation system configured to generate an alert in response to detecting one or more hazards in the vehicle awareness system's omnidirectional environment.

FIG. 4 depicts a block diagram of an exemplary vehicle awareness system 400 configured to react to detecting hazards in the omnidirectional environment data representing physical characteristics of the environment surrounding the vehicle. In some embodiments, the vehicle-coupled system 400 may be partially or completely implemented on one or more on-board computers 114, mobile devices 110, or alert devices 111/187 as depicted in FIG. 2. For example, the Data Transceiving Module 421, the Sensor Module 450, Data Processing Module 431, Hazard Detection Module 432, Vehicular Reaction Module 460 and Alert Module may be implemented as one or more applications 230 or routines 240 as described in connection with FIG. 2. Similarly, these modules may be implemented as Data Applications as described in connection with FIGS. 1A and 1B. Accordingly, vehicle awareness system 400 may be also be implemented in whole or in part on a server 140.

The system 400 may include an alert generation system 410, a network 130, sensors 120, vehicle controls 461, and alert devices 111. The alert generation system 410 may include a memory module 440, a data transceiving module 421, a sensor module 450, a controller 433, a vehicular reaction module 460 and an alert module 470. The controller 433 may further include a data processing module 431 and a hazard detection module 432.

The alert generation system 410 may be coupled to a vehicle, such as vehicles 108, 182.1, or 182.2. In some embodiments the alert generation system 410 is wirelessly coupled to a vehicle. In some embodiments, alert generation system 410 is physically coupled to a vehicle. In some embodiments, the alert generation system 410 is physically housed within the vehicle. In some embodiments, the alert generation system 410 is physically affixed to the vehicle on the exterior of the vehicle.

The memory module 440 includes one or more storage units, which may include one or more memories implemented as semiconductor memories, magnetically readable memories, or optically readable memories, for example. The memory module may be implemented as the data storage 228, program memory 160, or database 146 of FIGS. 1A and 2.

The data transceiving module 421 may be connected to the network 430 via link 422. Network 130 may be a proprietary network, a secure public internet, a virtual private network or some other type of network, such as dedicated access lines, plain ordinary telephone lines, satellite links, cellular data networks, combinations of these. As previously discussed, the network 130 may include one or more links 422 which may be implemented as radio frequency communication links, such as wireless communication links, or as wired communication links. Where the network 130 comprises the Internet, data communications may take place over the network 130 via an Internet communication protocol. The data transceiving module may 421 send or receive data over the network 430. This data may include omnidirectional environment data, hazard detection information, reaction selection information, customer data, or any other information helpful in detecting hazards in omnidirectional environment data and selecting and initiating a vehicular reaction in response to the detected hazard. The data transceiving module may also be implemented as the vehicle transceiver 122.

The sensor module 450 may be connected to the sensors 120 by link 452. The sensors 420 may include one or more of a GPS unit, a radar unit, a LIDAR unit, an ultrasonic sensor, an infrared sensor, an inductance sensor, a camera, an accelerometer, a tachometer, or a speedometer. The sensors 420 may also include one or more of a camera, a microphone, a pressure sensor, a thermometer, or similar sensors to monitor the vehicle operator and/or passengers within the vehicle. The sensor module may execute one or more applications or software routines to control the performance of the sensors 120 to gather sensor data. The sensor module 450 may also receive the sensor data, including omnidirectional environment data from the sensors 120. This data may then be stored in the memory module 440 for future use, sent over the network by the data transceiving module 421, or sent to the data processing module 431 or hazard detection module 432 for further processing. For example, the data processing module 431 may process the sensor data for use in the hazard detection module 432 by selecting a subset of the sensor data (such as the omnidirectional environment data or only relevant portions of the omnidirectional environment data). The hazard detection module 432 may then evaluate the subset of the sensor data for hazards in the omnidirectional environment. If a hazard is detected, the hazard detection module 432 may then signal the vehicular reaction module 460, the alert module 470 or the data transceiving module 421 for further action (such as selecting and initiating a vehicular reaction or transmitting an alert to an alert device).

The data processing module 431 processes the data and prepares it for analysis by the hazard detection module by collecting the data received from multiple sources and compiling it for use. The data processing module 431 may receive data from the sensor module 450, and may also receive data from memory module 440 and over the network 130 by the data transceiving module 421, which may include data from one or more third-party databases, including one or more databases run by an insurer. As discussed in greater detail elsewhere, this data may include (i) current conditions (such as current traffic conditions, current road conditions, or current weather conditions), (ii) past conditions (such as past traffic conditions, past road conditions, or past weather conditions), (iii) previously collected data (such as information related to the same or similar road, which may include past hazards in the same or similar traffic conditions, same or similar road conditions or same or similar weather conditions), and/or (iv) vehicle kinematic information. The data processing module 431 may process the data by selecting or prioritizing certain pieces of received data for use by the hazard detection module 432 in detecting whether there is a hazard in the omnidirectional environment.

The hazard detection module 432 may detect hazards in received data. The hazard detection module 432 may receive processed data from the data processing module 431 or may receive the data directly from the data transceiving module 421, the sensor module 450 or the memory module 440. The hazard detection module 432 may analyze the received data to detect a hazard in the omnidirectional environment of the vehicle awareness system 400 by reviewing the data for hazard markers. The hazard markers may be pre-programmed, or may be derived by a machine learning algorithm from previously-collected data as discussed below. Hazard markers may include any change or status in the omnidirectional environment that may indicate a danger to pedestrians or nearby vehicle occupants. The hazard detection process will be explained in further detail below in connection with FIG. 3. When the hazard detection module 432 detects a hazard, it may trigger a response from either the vehicular reaction module or the alert module.

The vehicular reaction module 460 may be connected to the vehicle controls 461 by link 462. The vehicle controls may correspond to an autonomous, semi-autonomous, or non-autonomous vehicle, such as vehicles 108 and 182. The vehicle controls 461 may include one or more autonomous or semi-autonomous features. After the hazard detection module 432 detects a hazard in the omnidirectional environment, the vehicular reaction module 460 may initiate a vehicular reaction via the vehicle controls in order to address or mitigate the hazard. For example, if the hazard detection module detects a hazard because one or more neighboring vehicles are too close, the vehicular reaction module 460 may, via the vehicle controls 461, take control of the vehicle and adjust the speed and steering of the car to increase the distance between the vehicle and the neighboring vehicle and thus mitigate the danger the hazard presents. As another example, if the hazard detection module 432 detects that the speed of the vehicle is slower or faster than the speed of neighboring vehicles, the vehicular reaction module 460 may, via the vehicle controls 461, increase or decrease the vehicle's speed as necessary in order to match that of the neighboring vehicles and mitigate the hazard's danger. The vehicular reaction process will be explained in further detail below in connection with FIG. 3.

The alert module 470 may be connected to the alert devices 111/187 by link 472. The alert devices may include a vehicle dashboard or heads-up display (HUD); a mobile device (such as the mobile devices 184 or 110) operated by the vehicle operator or passenger, a neighboring vehicle operator or passenger, or other nearby individual (such as a pedestrian or a cyclist); a computer located within or outside of a vehicle; automotive peripherals (such as vehicle seats, steering wheel or speakers); or any other device capable of alerting individuals within or nearby the vehicle. The alert devices 111/187 may issue an alert when the hazard detection module 432 detects a hazard in the omnidirectional environment data. These alerts may come in the form of visual alerts on a display screen (such as the display screen of a car dashboard or HUD, mobile device, or a computer), audio alerts played through speakers (such as the speakers of a mobile device, car stereo, headphones, or attached to a computer), or haptic alerts from a haptic transducer (such as vibrations in a mobile device, steering wheel, or vehicle seat). These alerts may inform or otherwise warn alert recipients of potential or immediate dangers. After receiving the alert, the alert recipient can take corrective action to avoid the danger.

Links 422, 452, 462, and 472 may be a physical connection, or may be a wireless connection. For example, links 422, 452, 462 and 472 may be a proprietary network, a secure public internet, a virtual private network or some other type of network, such as dedicated access lines, plain ordinary telephone lines, satellite links, cellular data networks, or combinations of these. In addition, although link 452 is depicted as a direct connection between the sensor module 450 and the sensors 120, this is not required. For example, link 452 may be a direct connection between the sensor module 450 and the sensors 420, or it may be a connection through one or more networks (such as the network 430), or some combination of both connection types. Similarly, link 462 may be a direct connection between the vehicular reaction module 460 and the vehicle controls 461, or it may be a connection through one or more networks (such as the network 430), or some combination of both connection types. Further, link 472 may be a direct connection between the alert module 470 and the alert devices 111/187, or it may be a connection through one or more networks (such as the network 130), or some combination of both connection types.

Figure 3:
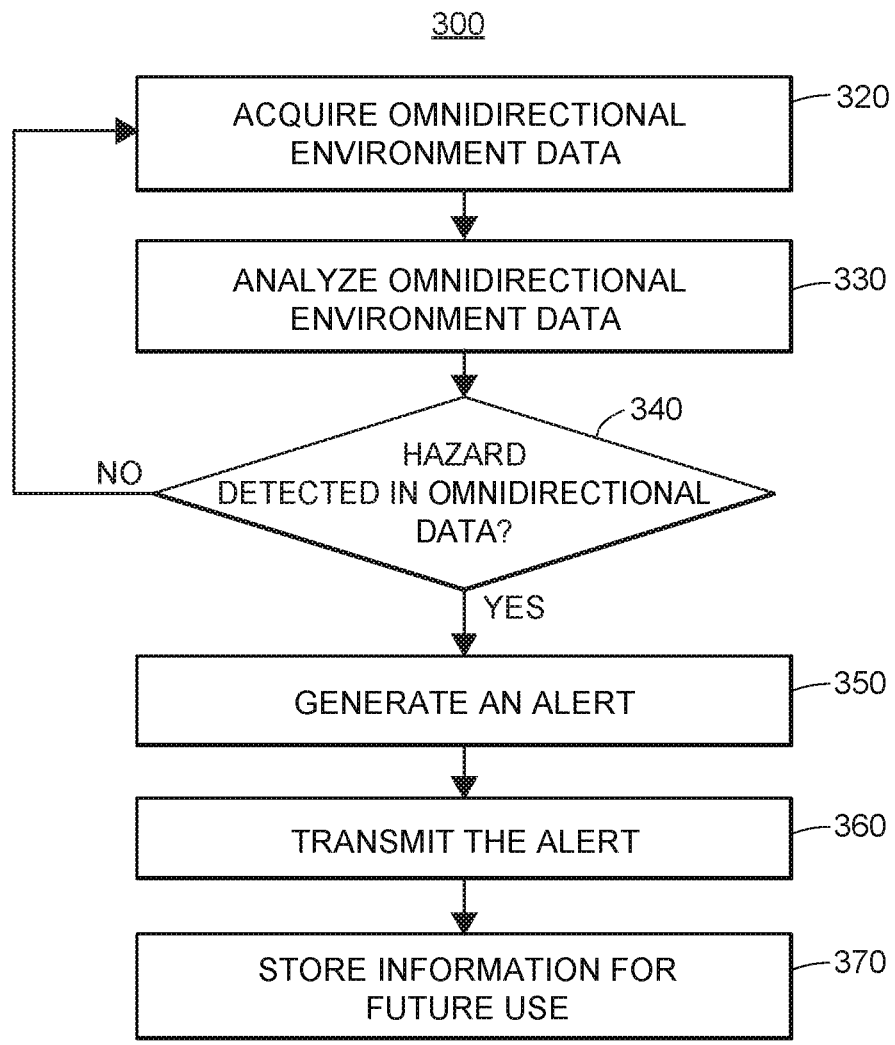
FIG. 3 illustrates a flow chart of an exemplary computer-implemented method for generating an alert in response to detecting one or more hazards in the vehicle awareness system's omnidirectional environment.

FIG. 3 illustrates a flow chart of an exemplary computer-implemented method 300 for generates and transmits an alert in response to detecting hazards in the omnidirectional environment data representing the physical detectable elements of the environment surrounding the vehicle. In some embodiments, the computer-implemented method 300 is a method for implementing at least one of the vehicle awareness systems 100 and 180. For example, the method 300 may be implemented by one or more of the autonomous and semi-autonomous operation information monitoring application, the route prediction application, the vehicle status monitoring application the alert generation application, the autonomous operation monitoring application, the alert initiation application, the autonomous vehicle operation application, the configuration routine, the sensor control routine, the autonomous control routine, the monitoring and reporting routine, the autonomous communication routine, and the omnidirectional environment data receiving routine as described above in connection with FIGS. 1A, 1B and 2. Accordingly, the method 300 may be partially or completely implemented on one or more server 140, mobile device 110, on-board computer 114, or alert device 111/187. Similarly, the one or more devices implementing the method 300 may be wirelessly connected to one another or to a network 130.

The present embodiments may provide a server 140 that collects omnidirectional environment data via wireless communication or data transmission over one or more radio links or wireless communication channels. Omnidirectional environment data may be gathered from various sources, such as from processors, transceivers 122/124, sensors 120, and/or cameras associated with smart infrastructure, smart or autonomous vehicles, mobile devices, and/or various sensors. After which, the server 140 may transmit omnidirectional environment data to vehicles, mobile devices, or wearable electronics of a user via wireless communication or data transmission over one or more radio links or wireless communication channels. The omnidirectional environment data may be generated and/or collected by sensors 120, such as mobile device-mounted sensors, vehicle-mounted sensors, and/or smart infrastructure-mounted sensors. The sensors 120 may also include cameras, microphones, radar detectors, and other sensors mentioned here. The sensor data may be collected before, during, and/or after an omnidirectional environment element is located adjacent to the vehicle 108. The high-level architecture may include both hardware and software applications, as well as various data communications channels for communicating data between the various hardware and software components. The received information may supplement the data received from the sensors 120.

At step 320, the system may acquire omnidirectional environment data from the omnidirectional environment. One or more of the mobile device 110, on-board computer 114, and server 140 may run a Data Application for collecting, generating, processing, analyzing, transmitting, receiving, and/or acting upon data associated with a vehicle 108/182 (e.g., sensor data, route and/or destination data, GPS data) or the vehicle environment (e.g., other vehicles operating near the vehicle 108). One or more of the sensors 120 may acquire omnidirectional environment data about the vehicle's omnidirectional environment. The sensor data may be collected by a specialized module, such as the sensor module 450, which operates the sensors and gathers the resulting sensor data. Some or all of the omnidirectional environment data may be received from a third party over a network 130. The information may be received at a data transceiving module 421 by the link 422 over the network 430. The omnidirectional environment data may be stored either locally within the vehicle or transmitted remotely to a third party machine 186, such as the third party machine of an insurer, to be processed. Whether stored locally or transmitted remotely, the omnidirectional environment data may be stored in a memory module, such as the memory module 440, the program memory of a computer or mobile device, such as the program memory 208, or some other storage device.

The omnidirectional environment data may be transmitted to or received from a third party over a network 130. For example, mobile computing devices 184.1 and 184.2 may be configured to communicate with one another via radio (or radio frequency) links 183b and 183c by each communicating with network 130 utilizing a cellular communication protocol. As an additional example, mobile computing devices 184.1 and/or 184.2 may be configured to communicate with external computing device (e.g., services provider remote server or a customer smart home controller) 186 via radio links 183b, 183c, and/or 183e. Still further, one or more of mobile computing devices 184.1 and/or 184.2 may also be configured to communicate with one or more smart infrastructure components 188 directly (e.g., via radio link 183d) and/or indirectly (e.g., via radio links 183c and 183f via network 130) using any suitable communication protocols. Similarly, one or more vehicle controllers 181.1 may be configured to communicate directly to the network 130 (via radio link 183b) or indirectly through mobile computing device 184.1 (via radio link 183b). Vehicle controllers 181.1 may also communicate with other vehicle controllers and/or mobile computing devices 184.2 directly or indirectly through mobile computing device 184.1 via local radio links 183a. Further, the data transceiving module 421 may be configured to communicate with an external computing device, such as the external computing device

186, via link 422, over the network 130. As discussed elsewhere here, network 130 may be implemented as a wireless telephony network (e.g., GSM, CDMA, LTE, etc.), a Wi-Fi network (e.g., via one or more IEEE 802.11 Standards), a WiMAX network, a Bluetooth® network, or similar network configurations.

Thus, links 183a-183g and 422 may represent wired links, wireless links, or any suitable combination thereof. For example, the links 183e and/or 183f may include wired links to the network 130, in addition to, or instead of, wireless radio connections. Accordingly, one or more vehicles may send omnidirectional environment data to one another, either directly or through an intermediate network. This allows, for example, autonomous or semi-autonomous vehicles to convey when their autonomous or semi-autonomous features have been engaged. As discussed previously, this may enable the generation of alerts for alert devices 111/187 that may warn nearby vehicles and pedestrians of the hazards resulting from the unpredictable vehicle operation of these systems.

Moving now to step 330, the method analyzes the omnidirectional environment data for the vehicle 108. The omnidirectional data is analyzed in real time to determine whether there is a hazard. In order to analyze the omnidirectional data, the present embodiment may compare acquired omnidirectional environment data with one or more of: (i) current conditions (such as current traffic conditions, current road conditions, or current weather conditions), (ii) past conditions (such as past traffic conditions, past road conditions, or past weather conditions), (iii) previously collected data (such as information related to the same or similar road, which may include past hazards in the same or similar traffic conditions, same or similar road conditions or same or similar weather conditions), and/or (iv) vehicle kinematic information (is speed less/greater). Current conditions may include the current traffic conditions, current road conditions, current weather conditions, or any other data about the current state of the omnidirectional environment. Past conditions may include past traffic conditions, past road conditions, past weather conditions, or any other data about the previous state of the omnidirectional environment. Past conditions may include data about conditions that are similar to the current conditions and may further include data about conditions in the same or similar location.

For example, the method may compare acquired omnidirectional environment data with data in the same weather and road conditions on the same road. As another example, if such data is not available, or in addition to such data, the present embodiment may compare acquired omnidirectional environment data with data in similar weather and road conditions on a road that is similar, but not identical to, the current location of the omnidirectional environment data. Similar roads may include roads that are nearby to the current location, or are similar in shape (e.g., winding or straight), size (e.g., narrow or wide), type (e.g., city street, major highway, minor highway, freeway, roundabout, intersection, or dirt road), speed limit, or typical level of traffic flow. Previously collected data may include data about past conditions, previous vehicle kinematic information, previously-detected hazards, previously-filed insurance claims. The previously collected information may relate to the same road or a similar road to that of the vehicle 108.

The omnidirectional environment data may be analyzed to determine whether certain intersections or road segments are prone to certain types of hazards (e.g., parked cars or autonomous or semi-autonomous vehicles). This analysis may be performed in real time, beforehand, or any combination of the two. The omnidirectional environment data may indicate events before, during, and/or after the vehicle awareness system enters a specific location. For instance, the omnidirectional environment data may be analyzed to determine a nearby vehicle has recently parked and has not yet opened their door. This may present a collision risk to other vehicles or cyclists or pedestrians. As another example, the omnidirectional data may be analyzed to determine that an autonomous or semi-autonomous vehicle has just entered the same location or a location nearby the vehicle awareness system. Similarly the omnidirectional environment data may be analyzed to predict events that may happen in the future. For example, the path of a vehicle may be predicted by analyzing where that vehicle has driven in the past (e.g., frequent destination), or by analyzing where other vehicles have driven in the past (e.g., popular destinations in the area or commonly-used routes). This analysis may also take into account the driving habits of the vehicle or of other vehicles (e.g., frequently driving through stop signs or speeding). These driving habits may be important to predicting the timing of when a vehicle arrives at a certain location. Accordingly, taking these into account can help the vehicle awareness system better predict when a vehicle might be close enough to create a hazard.

Other examples may include analyzing the omnidirectional environment data to determine whether a vehicle frequently makes sudden stops, changes lanes, grossly exceeds the speed limit, drives substantially lower than a speed limit, frequently proceeds through a yellow light, frequently stops at yellow lights, often is located at the scene of vehicle collision, and other measurable and recordable driving habits. The vehicle collision data may be analyzed to determine whether pedestrian walk lights and/or smart infrastructure are leading to, or causing, vehicle collisions. The omnidirectional environment data may be used to determine when (e.g., a time of day) and/or under what environment conditions a vehicle typically travels, thereby be predisposed to potential changes in vehicle status (e.g., a car leaving its parking space). For example, certain road areas may be more problematic during rush hour or at night, or when under construction, or when it is raining or snowing. The omnidirectional environment data may be used to identify a time of year that the hazardous area is at a lower or elevated risk, such as certain bridges or ramps may be at a higher risk when the weather includes freezing rain or ice during winter months. For example, omnidirectional environment data may indicate that certain intersections or portions of roads may be associated with a higher-than-average number of vehicle, bicycle, and/or pedestrian collisions, a higher amount of traffic, a large amount of road construction, abnormal traffic patterns, auto insurance claims including more serious vehicle damage or pedestrian and passenger damages, etc.

When analyzing the omnidirectional environment data, the present embodiment may generate a normalized profile for the omnidirectional environment data. The normalized profile may represent an expected range of values for the omnidirectional environment data. For example, when the omnidirectional environment data includes proximity data to nearby vehicles, the normalized profile may include an expected range of distance between nearby vehicles (e.g., 10 or more feet). In another example, the omnidirectional environment data may include a count of the number of cars within a certain distance that have autonomous or semi-autonomous features engaged. In this case, the normalized profile may include an expected number of vehicles with such features engaged before determining to issue an alert (e.g., 3 nearby cars with autonomous or semi-autonomous features engaged). Such a normalized profile may be useful as autonomous or semi-autonomous vehicles become increasingly common to avoid sending excessive alerts to nearby pedestrians and drivers.

The normalized profile may be generated previously based upon previously collected data. The normalized profile may be generated in real time as well based upon previously collected data, presently collected data, or any combination of the two. A previously-generated normalized profile may also be updated in real-time or after the fact based upon previously collected data, presently collected data, or any combination of the two. These normalized profiles may be compared to the omnidirectional environment data to determine in real time whether a hazard is detected. In some embodiments, the system may also use machine learning techniques as described below to determine whether a hazard is detected in the omnidirectional data.

After analyzing the omnidirectional data, the present embodiment may proceed to step 340, where it determines whether a hazard is detected in the omnidirectional data. The present embodiment may determine whether a hazard is detected in the omnidirectional data by determining whether the omnidirectional environment data differs from the normalized profile. The present embodiment may include certain maximum or minimum thresholds before a hazard is detected. These thresholds may apply directly to omnidirectional environment data or vehicle kinematic information, or may apply to more advanced omnidirectional environment data analysis. As another example, the present embodiment may determine that, based upon the omnidirectional data, one or more pedestrians are nearby either on foot or on a bicycle, skateboard or other similar vehicle. In this case, the threshold may be distance from one of the vehicle 108's doors, such as greater than 5 feet and less than 10 feet. The present embodiment may not determine that a hazard is present until a pedestrian is between 5 and 10 feet away from the vehicle 108's door. In this way, the method may avoid sending alerts to pedestrians who are not in danger from the car's door because they are either occupants of the vehicle, or are too far away to be injured by the vehicle's door opening.

Alternatively, the present embodiments may determine a score for each potential hazard in the omnidirectional data. If the determined score exceeds a predetermined threshold, the present embodiments may then determine that a hazard is detected. The determined score may reflect, for example, a predicted probability of collision or injury or a predicted level of success for an alert.

Although the examples above only discuss individual thresholds, the present invention is in no way limited to using a single threshold. The invention may use more than one threshold before determining that a hazard is present. Further, an embodiment using more than one threshold may not require every threshold to be met. For example, if an embodiment uses five thresholds, it may only require that three of them be met before detecting a hazard. Alternatively, it may always require one of the thresholds to be met and then only require two of the remaining four thresholds before detecting a hazard. Any combination of one or more thresholds is contemplated by the scope of this invention.

If no hazard is detected, then the method 300 returns to step 320 and acquires more omnidirectional environment data and continues method 300 as described above. If a hazard is detected, then the method 300 proceeds to step 350.

At step 350, the method 300 generates an alert in response to the detected hazard in the omnidirectional environment. As discussed above, the alerts may be generated by the alert module 470 and initiated by the alert devices 111/187. The alerts may also be generated by an alert generation application and initiated by an alert initiation application. When determining the alert, the alert module 470 may determine an alert type, an alert recipient and an alert contents. As discussed above, the alert types may include visual alerts on a display screen (such as the display screen of a car dashboard or HUD, mobile device, or a computer), audio alerts played through speakers (such as the speakers of a mobile device, car stereo, headphones, or attached to a computer), or haptic alerts from a haptic transducer (such as vibrations in a mobile device, steering wheel, or vehicle seat). The alert recipients may include the human operator of a vehicle, nearby vehicle operators, nearby pedestrians, or passengers of one or more vehicles as appropriate. The alert contents may include information on the type of hazard detected, information on the threat to the alert recipient, or a recommendation for next actions in order to avoid the hazard.

In some instances, the alerts may react directly to the hazards immediately present in the omnidirectional environment. For example, as discussed above, the alert may react to a parked vehicle or autonomous or semi-autonomous vehicle that is currently near the vehicle awareness system. In other instances, the alerts may respond to predicted future occurrences based upon hazards in the omnidirectional environment. For example, as discussed above, the vehicle awareness system may predict the future route of one or more vehicles. If an autonomous or semi-autonomous vehicle or other potential hazard is about to be near the vehicle awareness system, an alert may be generated warning of the potential hazard. In some cases, previous information may be available on other cars and may be used to determine an alert. For example, the vehicle awareness system may predict the pattern of another vehicle on the road based upon previously recorded driving behavior. If a particular car or driver always or nearly always turns left at a certain street, the present embodiment may alert the vehicle 108's operator to that the car is likely to turn left and suggest that the vehicle 108's operator slow the primary car, increase its following distance, or get into another lane so as to avoid a potential collision or unnecessary slowdown.

Once the present embodiment has determined the vehicular reaction or alert in step 350, it may then transmit the alert in step 360. The alert may be transmitted to one or more alert devices 111/187. The alert devices may initiate the alert using an alert initiation routine. The alerts may include any combination of visual, audio or haptic stimuli and may inform the recipient of any combination of the presence of a hazard, the nature of the hazard, the location of the hazard, or steps to avoid the hazard. The alert devices may include a mobile device or on-board computer associated with one or more vehicle occupants, or may include the mobile device of a pedestrian placed in danger by a detected hazard. The alerts may be transmitted over the network 130 by a server 140 or by any other device that generates the alerts. In other embodiments, the alert generation may happen locally on the device and the alerts may simply be transmitted to the alert initiation routine to initiate the alert.

In some embodiments, after initiating the vehicular reaction, the present embodiment may store the recorded information for future use at step 370. The stored information may include the omnidirectional environment data from step 320, the detected hazard from step 340, the determined alert from step 350, the success of the determined alert, and omnidirectional environment data analyzed in step 330. This recorded information may be stored locally on the vehicle 108, or may be transmitted to a third party machine 186, or both. If stored locally, the recorded information may be stored on a memory module 440, the program memory 208 of an on-board computer or mobile device, or any other storage device. The recorded information may be temporarily stored locally and later transmitted over a network 130 to a third party machine 186. This may be useful if the connection to the network is temporarily unavailable or not strong enough to sustain reliable data transmission. If transmitted to a third party machine 186, the data may be transmitted by the data transceiving module 421, I/O circuit 166 or I/O circuit 216. Data stored for future use may be used to improve the accuracy of machine learning models which may be used for detecting hazards, it may also be used to help detect hazards as discussed in connection with the past conditions and previously collected data in step 330.

Figure 5:
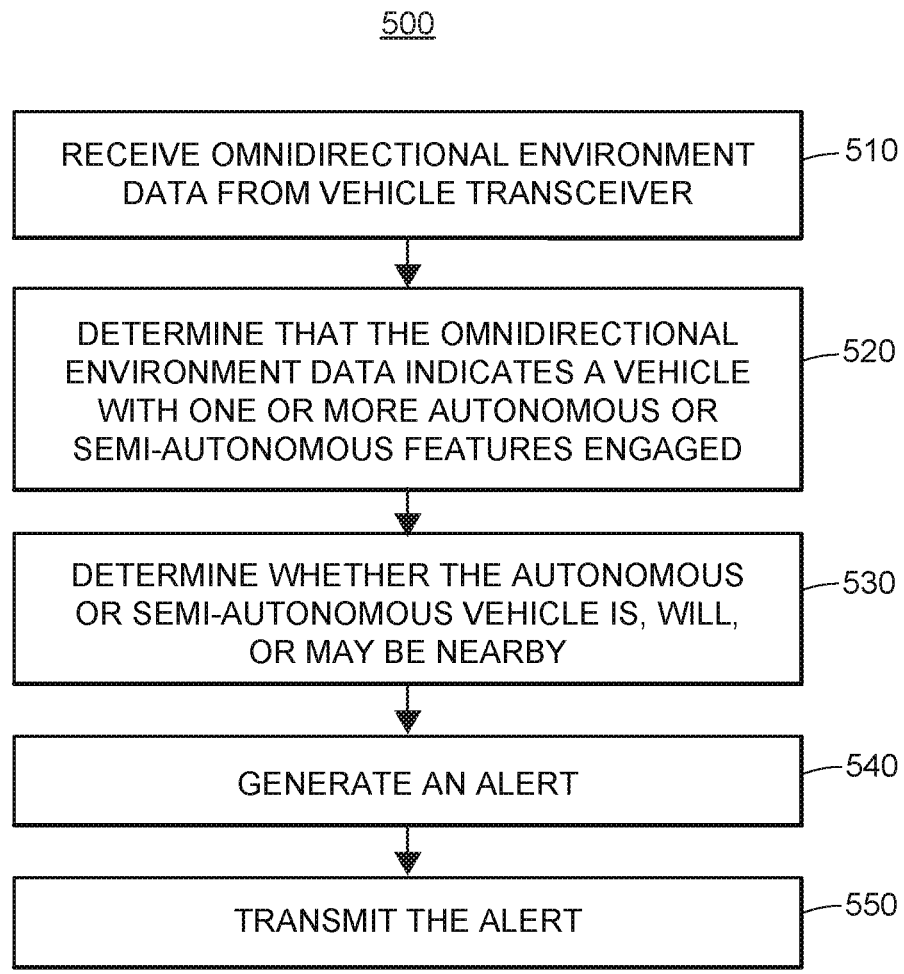
FIG. 5 illustrates a flowchart of an exemplary embodiment of the vehicle awareness system that generates and transmits an alert in response to determining that an autonomous or semi-autonomous vehicle is nearby.

FIG. 5 depicts a flowchart of an exemplary embodiment of the vehicle awareness system. The flowchart depicts a method 500, which generates and transmits an alert in response to determining that an autonomous or semi-autonomous vehicle is nearby. The method 500 may be an implementation of the method 300 executed within the vehicle awareness systems 100 and 180. The method 500 may be executed in cooperation with one or more of the autonomous and semi-autonomous operation information monitoring application, the route prediction application, the alert generation application, the autonomous operation monitoring application, the alert initiation application, the autonomous vehicle operation application, the configuration routine, the sensor control routine, the autonomous control routine, the monitoring and reporting routine, the autonomous communication routine, and the omnidirectional environment data receiving routine as described above in connection with FIGS. 1A, 1B and 2. Accordingly, the method 500 may be partially or completely implemented on one or more server 140, mobile device 110, on-board computer 114, or alert device 111/187. Similarly, the one or more devices implementing the method 300 may be wirelessly connected to one another or to a network 130.

The method 500 begins at step 510, where the vehicle awareness system receives omnidirectional environment data from a vehicle transceiver of another vehicle. As stated above, the omnidirectional environment data may include information corresponding to one or more vehicles in the vehicle awareness system's omnidirectional environment, which includes vehicles located to the left, right, in front of, behind, beneath or above the vehicle awareness system. In some embodiments, the vehicle awareness system receives the omnidirectional environment data directly from the vehicle transceiver. For example, the vehicle awareness system 180 may receive the omnidirectional environment data via a direct wireless link (e.g., via a V2V communication link) with the vehicle transceiver. In other embodiments, the vehicle awareness system receives the omnidirectional environment data via a link with a network 130. For example, the vehicle transceiver 122 may send the omnidirectional environment data to a server 140 via a wired or wireless network link 118 with a network 130, such as the Internet. The vehicle awareness system may then receive the omnidirectional environment data from the server 140 via a wired or wireless network link 118 with the network 130.

In some embodiments, the vehicle transceiver can only send data and the vehicle awareness system can only receive data. In other embodiments, the vehicle transceiver and vehicle awareness system may each send and receive data. In some embodiments, there is only one vehicle transceiver and only one vehicle awareness system. In other embodiments, there are multiple vehicle transceivers and multiple vehicle awareness systems, each associated with a different vehicle or person, thereby creating a network of interconnected transceivers and awareness systems that communicate with each other when in proximity to one another.

The omnidirectional environment data may vary according to the sensors available in the vehicle. In some embodiments, the vehicle may be equipped with sensors or software flags (such as in an autonomous operation monitoring application) that indicate whether certain individual autonomous or semi-autonomous features are enabled the omnidirectional environment data may include information on the autonomous or semi-autonomous features of a vehicle, whether those features are enabled. The vehicle may also be equipped with a GPS sensor and the omnidirectional environment data may also include one or more of the vehicle's current location and current heading. In other embodiments, the vehicle may be equipped with sensors or software flags (such as in a vehicle guidance system) omnidirectional environment data may further include one or more of the vehicle's current destination and planned route.

The omnidirectional environment data may be analyzed in order to identify one or more hazards in the omnidirectional environment. Accordingly, the information available in the omnidirectional environment data, as determined by the sensors available in the vehicle, may influence the vehicle awareness system's analysis. In embodiments where the omnidirectional environment data includes a planned route for a vehicle and the vehicle awareness system may predict where the vehicle will be based upon the planned route. In embodiments where the omnidirectional environment data does not include a planned route, but does include a planned destination, the vehicle awareness system may predict the vehicle's route to its planned destination in and predict where the vehicle will be based upon the predicted route. In embodiments where the omnidirectional environment data only includes the vehicle's current location, the vehicle awareness system may have to predict a predicted destination and/or a predicted route, and predict where the vehicle will be based upon the predicted route to the predicted destination. As one skilled in the art will appreciate, this prediction of where the vehicle will be may be less accurate than predicting where the vehicle will be based upon its planned destination. Accordingly, the vehicle awareness system's accuracy may vary based upon the information available in the omnidirectional environment data.

Moving on to step 520, the vehicle awareness system may then determine that the omnidirectional environment data indicates a vehicle with one or more autonomous or semi-autonomous features engaged. For example, the vehicle awareness system may examine the omnidirectional environment data, including information on the vehicle's available autonomous or semi-autonomous features and whether those features are engaged. If the omnidirectional environment data provides information that a vehicle has one or more autonomous or semi-autonomous features and that one or more of these features are engaged, the vehicle awareness system may determine that the omnidirectional environment data indicates a vehicle with one or more autonomous or semi-autonomous features engaged.

At step 530, once it determines that the omnidirectional environment data indicates a vehicle with autonomous or semi-autonomous features engaged, the vehicle awareness system then determines whether the autonomous or semi-autonomous vehicle is, will, or may be near the vehicle awareness system or alert device. The vehicle awareness system's behavior at this step may vary with the information available in the omnidirectional environment data.

In one embodiment, in addition to autonomous and semi-autonomous feature information, the omnidirectional environment data may include the location of the vehicle as measured by a GPS sensor coupled to the vehicle. In this case, the vehicle awareness system may determine that the autonomous or semi-autonomous vehicle is nearby if it is within a given radius of either the vehicle awareness system or an alert device based upon location data from a GPS sensor associated with the vehicle awareness system or the alert device. The vehicle awareness system may also determine that the autonomous or semi-autonomous vehicle is nearby if it is within a certain radius of the planned route for the vehicle awareness system or the alert device.

In another embodiment, the omnidirectional environment data may also include a planned route for the autonomous or semi-autonomous vehicle as determined by a vehicle guidance system. In this case, the vehicle awareness system may compare the vehicle's planned route with one or more of the vehicle awareness system or alert device's current location or planned route. For example, the vehicle awareness system may compare the planned routes of both the vehicle and the alert device, including estimated speed, and determine that they are likely to intersect each other within a certain radius. The vehicle awareness system may determine that the vehicle and alert device's planned routes intersect within a certain radius of one another and thus determine that the vehicle is nearby.

Although FIG. 5 depicts step 530 as happening after step 520, it should be clear to one skilled in the art that steps 520 and 530 may happen in any order, or indeed may happen simultaneously in parallel computing environments.

After determining that the autonomous or semi-autonomous vehicle is nearby and/or may intersect the vehicle's intended route, the method 500 proceeds to step 540, where the vehicle awareness system generates an alert. Generating the alert may include generating an alert type, an alert recipient and an alert contents. The vehicle awareness system may select one or more alert recipients based upon the determination in step 530. In the examples associated with step 530, the vehicle awareness system may identify one or more alert devices that are nearby the autonomous or semi-autonomous vehicle. These alert devices may be associated with a vehicle, vehicle operator, cyclist, or pedestrian. Similarly, the alert recipients may include one or more of a vehicle operator, a cyclist, or a pedestrian.

When selecting the alert type, the vehicle awareness system may select any combination of an audio, visual, or haptic alert. The vehicle awareness system may select the alert type based upon one or more alert recipient preferences, current alert recipient activities, or alert device location. For example, the alert recipient may have expressed a preference for haptic alerts. As another example, if an alert recipient is currently driving, the vehicle awareness system may determine that audio alerts are more appropriate in order to allow the alert recipient to keep their eyes on the road.

The vehicle awareness system selects the alert contents to inform the alert recipient of the hazard (i.e., the autonomous or semi-autonomous vehicle). In some embodiments, the vehicle awareness system may limit or exclude certain information from the alert contents in order to reduce alert recipient confusion or distraction. For example, if the alert recipient is a cyclist who cannot take their eyes off the road or wear headphones to receive an audio alert, the alert contents may simply indicate that there is a hazard nearby by providing a haptic pattern that corresponds to a certain type of hazard (e.g., three vibrations indicates an autonomous or semi-autonomous vehicle and four vibrations indicates a recently parked vehicle). The vehicle awareness system may also select the alert contents based upon what kinds of information is available in the omnidirectional environment data. In some embodiments, when the omnidirectional environment data only includes the current location of the autonomous or semi-autonomous vehicle, the alert contents may only include that location and text or a graphic indicating that there is an autonomous or semi-autonomous vehicle nearby. In other embodiments, when the omnidirectional environment data includes a destination, heading, or planned route for the autonomous or semi-autonomous vehicle, the alert contents may include a graphic showing the heading, destination, or planned or predicted route for the autonomous or semi-autonomous vehicle. The alert contents may further include a predicted intersection point for the alert device and autonomous or semi-autonomous vehicle and a textual or graphic indication that there is an autonomous or semi-autonomous vehicle nearby.

After generating the alert, the method 500 proceeds to step 550, where the vehicle awareness system transmits the alert to the one or more alert devices. The vehicle awareness system may transmit the alert directly to the one or more alert devices directly via a wired or wireless connection, or may do so through a network, such as the network 130. The alert device may then initiate the alert and the alert recipient may then receive and react to the alert. For example, the alert recipient may receive a haptic or audio notification from their phone accompanied with text or a graphic indicating that there is an autonomous or semi-autonomous vehicle nearby. The alert recipient can then take precautions to prepare for or react to the nearby autonomous or semi-autonomous vehicle.

Figure 6:
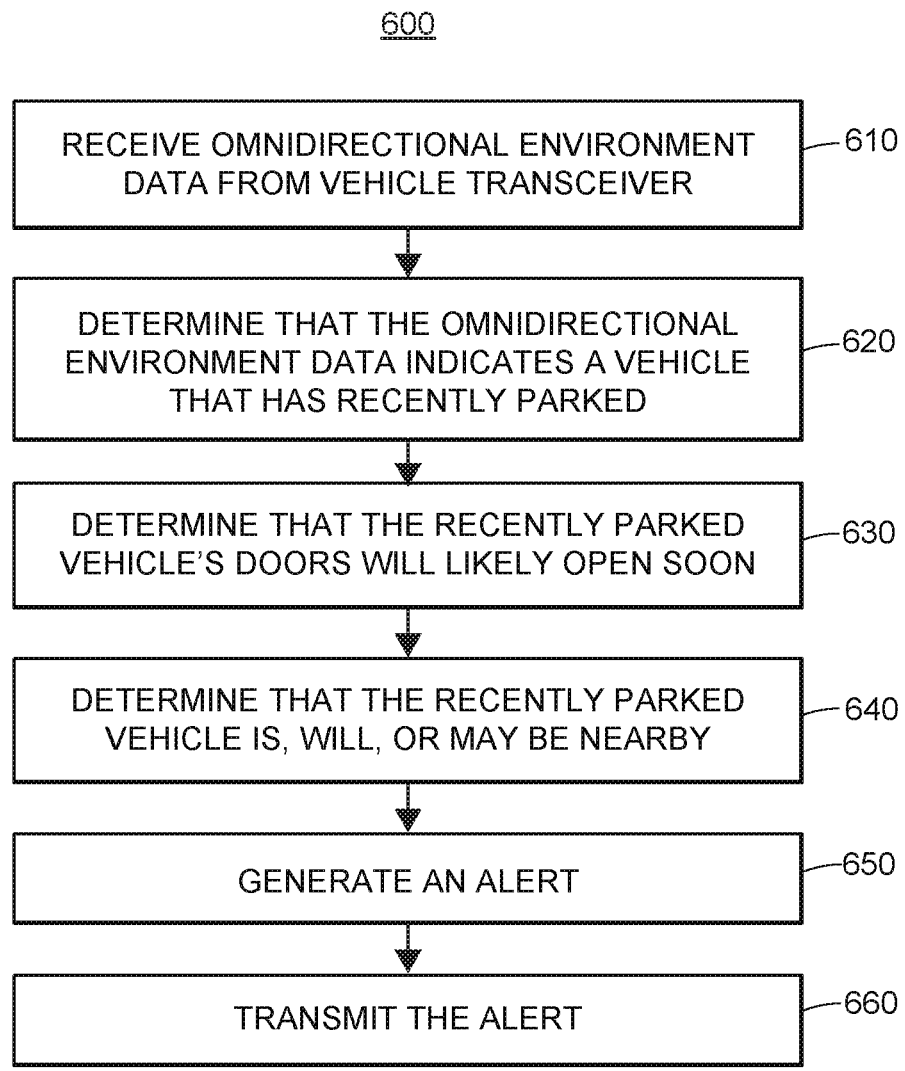
FIG. 6 illustrates a flowchart of an exemplary embodiment of the vehicle awareness system that generates and transmits an alert in response to determining that a recently parked vehicle is nearby and is likely to open its doors soon.

FIG. 6 depicts a flowchart of an exemplary embodiment of the vehicle awareness system. The flowchart depicts a method 600, which generates and transmits an alert in response to determining that a recently parked vehicle is nearby and is likely to open its doors soon. The method 600 may be an implementation of the method 600 or the vehicle awareness systems 100 and 180. The method 600 may be executed in cooperation with by one or more of the autonomous and semi-autonomous operation information monitoring application, the route prediction application, the alert generation application, the autonomous operation monitoring application, the alert initiation application, the autonomous vehicle operation application, the configuration routine, the sensor control routine, the autonomous control routine, the monitoring and reporting routine, the autonomous communication routine, and the omnidirectional environment data receiving routine as described above in connection with FIGS. 1A, 1B and 2. Accordingly, the method 300 may be partially or completely implemented on one or more server 140, mobile device 110, on-board computer 114, or alert device 111/187. Similarly, the one or more devices implementing the method 300 may be wirelessly connected to one another or to a network 130.

The method 600 begins at step 610, where the vehicle awareness system receives omnidirectional environment data from a vehicle transceiver. As stated above, the omnidirectional environment data may include information corresponding to one or more vehicles in the vehicle awareness system's omnidirectional environment, which includes vehicles located to the left, right, in front of, behind, beneath or above the vehicle awareness system. In some embodiments, the vehicle awareness system receives the omnidirectional environment data directly from the vehicle transceiver. For example, the vehicle awareness system 180 may receive the omnidirectional environment data via a direct wireless link (e.g., via a V2V communication link) with the vehicle transceiver. In other embodiments, the vehicle awareness system receives the omnidirectional environment data via a link with a network 130. For example, the vehicle transceiver 122 may send the omnidirectional environment data to a server 140 via a wired or wireless network link 118 with a network 130, such as the Internet. The vehicle awareness system may then receive the omnidirectional environment data from the server 140 via a wired or wireless network link 118 with the network 130.

In some embodiments, the vehicle transceiver can only sending data and the vehicle awareness system can only receive data. In other embodiments, the vehicle transceiver and vehicle awareness system can each send and receive data. In some embodiments, there is only one vehicle transceiver and only one vehicle awareness system. In other embodiments, there are multiple vehicle transceivers and multiple vehicle awareness systems.

The omnidirectional environment data may vary according to the sensors available in the vehicle. In some embodiments, the vehicle may be equipped with a GPS sensor and the omnidirectional environment data may include information on the vehicle's current location. In other embodiments, the vehicle may be equipped with transmission sensors that indicate the vehicle's current gear and the omnidirectional environment data may further include information that the vehicle has recently shifted into park. In still further embodiments, the vehicle may be equipped with door sensors that indicate whether a door is open and the omnidirectional environment data may also include information on whether one of the doors have opened or the vehicle may be equipped with interior sensors, such as cameras or weight sensors that indicate the current number of vehicle occupants and the omnidirectional environment data may include information on the current number of vehicle occupants.

The omnidirectional environment data may be analyzed to identify one or more hazards in the omnidirectional environment. Accordingly, the information available in the omnidirectional environment data, as determined by the sensors available in the vehicle, may influence the vehicle awareness system's analysis. In embodiments where the omnidirectional environment data includes information on whether the vehicle has recently shifted into park, the vehicle awareness system may not predict whether the vehicle has recently parked. In embodiments where the omnidirectional environment data does not include information on whether the vehicle has recently shifted into park, the vehicle awareness system may predict whether it has recently shifted into park based upon the vehicle's location not changing in a set period of time. As one skilled in the art will appreciate, this prediction may be less accurate than receiving the information directly from the omnidirectional environment data. Accordingly, the vehicle awareness system's accuracy may vary based upon the information available in the omnidirectional environment data.

Moving on to step 620, the vehicle awareness system may then determine that the omnidirectional environment data indicates a vehicle that has recently parked. If the omnidirectional environment data only includes vehicle location information measured by a GPS sensor coupled to the vehicle, the vehicle awareness system may predict that the vehicle has recently parked. For example, if the vehicle's location has not changed in a certain amount of time (e.g., 30 seconds) the vehicle awareness system may determine that the vehicle has recently parked. If the omnidirectional environment data includes further information, such as whether the vehicle has recently shifted into park, the vehicle awareness system may determine that the vehicle has recently parked when the omnidirectional environment data indicates that it has recently shifted into park.

At step 630, once it determines that the vehicle has recently parked, the vehicle awareness system may then determine that the vehicle's doors are likely to open soon. If the omnidirectional environment data only includes vehicle location information, the vehicle awareness system may predict that the vehicle's doors are likely to open soon. For example, if the vehicle has been parked for a certain period of time (e.g., 2 minutes or less) as measured by a transmission sensor, the vehicle awareness may determine that its doors will likely open soon. In other embodiments, the omnidirectional environment data may include information on whether the vehicle's doors have opened recently as measured by door sensors. In this case, the vehicle awareness system may determine that the vehicle's doors will likely open if it has parked recently and its doors have not opened recently. In other embodiments, the omnidirectional environment data may include information on the current number of vehicle occupants as measured by cameras or weight sensors. In this case, the vehicle awareness system may determine that the vehicle's doors will likely open if it has parked recently and the current number of occupants is greater than zero.

At step 640, once it determines that the omnidirectional environment data indicates a vehicle with autonomous or semi-autonomous features engaged, the vehicle awareness system then determines whether the recently parked vehicle is, will, or may be near the vehicle awareness system or alert device. The vehicle awareness system's behavior at this step may vary with the information available in the omnidirectional environment data.

In one embodiment, the omnidirectional environment data may only include the location of the vehicle as measured by a GPS sensor coupled to the vehicle. In this case, the vehicle awareness system may determine that the recently parked vehicle is nearby only if it is within a given radius of either the vehicle awareness system or an alert device. The vehicle awareness system may also determine that the recently parked vehicle is nearby if it is within a certain radius of the planned route for the vehicle awareness system or the alert device.

Although FIG. 6 depicts step 630 as happening after step 620 and step 640 as happening after step 630, it should be clear to one skilled in the art that steps 620, 630, and 640 may happen in any order, or indeed may happen simultaneously in parallel computing environments.

After determining that the recently parked vehicle is nearby, the method 600 proceeds to step 650, where the vehicle awareness system generates an alert. Generating the alert may include generating an alert type, an alert recipient and an alert contents. The vehicle awareness system may select one or more alert recipients based upon the determination in step 640. In the examples associated with step 640, the vehicle awareness system may identify one or more alert devices that are nearby the autonomous or semi-autonomous vehicle. These alert devices may be associated with a vehicle, vehicle operator, cyclist, or pedestrian. The vehicle awareness system may select those alert devices as alert recipients.

When selecting the alert type, the vehicle awareness system may select any combination of an audio, visual, or haptic alert. The vehicle awareness system may select the alert type based upon one or more alert recipient preferences, current alert recipient activities, or alert device location. For example, the alert recipient may have expressed a preference for haptic alerts. As another example, if an alert recipient is currently cycling and is unable to look at their phone or hear audio alerts via headphones, the vehicle awareness system may determine that haptic alerts are more appropriate in order to allow the alert recipient to keep their eyes on the road. However, as another example, if the alert recipient is a pedestrian who is able to use headphones, the vehicle awareness system may select an audio alert that can provide more information, including the location of the recently parked vehicle.

The vehicle awareness system selects the alert contents to inform the alert recipient of the hazard (i.e., the recently parked). In some embodiments, the vehicle awareness system may limit or exclude certain information from the alert contents in order to reduce alert recipient confusion or distraction. For example, if the alert recipient is a cyclist who cannot take their eyes off the road or wear headphones to receive an audio alert, the alert contents may simply indicate that there is a hazard nearby by providing a haptic pattern that corresponds to a certain type of hazard (e.g., three vibrations indicates an autonomous or semi-autonomous vehicle and four vibrations indicates a recently parked vehicle). The vehicle awareness system may also select the alert contents based upon what kinds of information is available in the omnidirectional environment data. In some embodiments, when the omnidirectional environment data only includes the current location of the recently parked vehicle, the alert contents may only include that location and text or a graphic indicating that there is an recently parked vehicle nearby whose doors are likely to open.

After generating the alert, the method 600 proceeds to step 660, where the vehicle awareness system transmits the alert to the one or more alert devices. The vehicle awareness system may transmit the alert directly to the one or more alert devices directly via a wired or wireless connection, or may do so through a network, such as the network 130. The alert device may then initiate the alert and the alert recipient may then receive and react to the alert. For example, the alert recipient may receive a haptic or audio notification from their phone accompanied with text or a graphic indicating that there is a recently parked nearby whose doors are about to open. The alert recipient can then take precautions to prepare for or react to the nearby recently parked vehicle.

Machine Learning and Other Matters

In certain embodiments, the machine learning techniques, such as cognitive learning, deep learning, combined learning, heuristic engines and algorithms, and/or pattern recognition techniques. For instance, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data, including the historical auto insurance claim data discussed herein. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processing element (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also be able to predict which vehicles are more prone to be classified as a total loss in the event of a vehicle collision, such as by vehicle characteristics determined from vehicle or other data.

The processing element and/or machine learning algorithm may determine historical storage, rental, or salvage time and/or costs typically expected with various types of vehicles or with vehicles having specific characteristics (such as make, model, mileage, age, etc.)—such as by analysis of scrubbed or depersonalized historical or past auto claim data. As such, a total loss may be predicted when a given vehicle is involved in a vehicle collision, and if so, the total loss cycle time may be reduced, and inconvenience to the insured may be reduced.

Exemplary Method Embodiments

In one aspect, a computer-implemented method for improving vehicle safety is may be provided. The method may include: (1) acquiring, by one or more transceivers communicatively coupled to a vehicle awareness system, omnidirectional environment data from one or more transceivers, where the omnidirectional environment data represents kinetic information on one or more physically detectable elements omnidirectional to the vehicle awareness system, and where at least one of the one or more transceivers are not physically coupled to the vehicle awareness system; (2) analyzing, via one or more processors, the omnidirectional environment data to detect one or more hazards in the omnidirectional environment data; (3) generating, via the one or more processors, an alert in response to detecting the one or more hazards; and (4) transmitting, via the one or more processors and/or transceivers, the alert to at least one alert device. The method may include additional, less, or alternate actions, including those discussed elsewhere herein.

In another aspect, one or more of the transceivers may be communicatively coupled to one or more peripheral vehicles, where the one or more peripheral vehicles is adjacent to the primary vehicle. In yet another aspect, one or more of the transceivers may be communicatively coupled to one or more pedestrians, where the one or more pedestrians is adjacent to the primary vehicle. Still further, one or more of the transceivers may be communicatively coupled to one or more physical structures, where the one or more physical structures is adjacent to the primary vehicle.

In another aspect, the one or more hazards may indicate at least one of (1) an autonomous or semi-autonomous feature of a vehicle in the omnidirectional environment of the vehicle awareness system, (2) the current status of a vehicle in the omnidirectional environment of the vehicle awareness system, and (3) a change in the kinetic behavior of the one or more physically detectable elements omnidirectional to the vehicle awareness system. Still further, current status of a vehicle in the omnidirectional environment of the primary vehicle may include the vehicle's doors have not been opened since it parked.

In another aspect, the at least one alert devices may include one of (1) an on-board computer coupled to the primary vehicle, (2) a mobile device associated with one or more of the occupants of a vehicle, and (3) a mobile device associated with one or more pedestrians. In yet another aspect, generating an alert may include selecting one or more of a visual alert, an audio alert, and a haptic alert.

In another aspect, analyzing the omnidirectional environment data to detect one or more hazards further may include analyzing the kinematic information of a vehicle to generate a predicted route for the vehicle. Still further, the omnidirectional environment data may be acquired over a wireless network from a third-party.

Exemplary System Environments

In one aspect, a computer system configured to improve vehicle safety may be provided. The system may include: (1) one or more transceivers, communicatively coupled to a vehicle awareness system, configured to acquire omnidirectional environment data, where the omnidirectional environment data represents kinetic information on one or more physically detectable elements omnidirectional to the vehicle awareness system, and where at least one of the one or more transceivers are not physically coupled to the vehicle awareness system; (2) one or more processors configured to analyze the omnidirectional environment data, where the one or more processors is configured to detect one or more hazards in the omnidirectional environment data; and (3) one or more alert systems (and/or associated processors and transceivers) configured to generate an alert in response to the one or more processors detecting the one or more hazards, and configured to transmit the alert to at least one alert device.

In another aspect, the one or more of the transceivers may be communicatively coupled to one or more peripheral vehicles, where the one or more peripheral vehicles is adjacent to the primary vehicle. In yet another aspect, the one or more of the transceivers may be communicatively coupled to one or more pedestrians, where the one or more pedestrians is adjacent to the primary vehicle. Still further, the one or more of the transceivers may be communicatively coupled to one or more physical structures, where the one or more physical structures is adjacent to the primary vehicle.

In another aspect, the one or more hazards may indicate at least one of (1) an autonomous or semi-autonomous feature of a vehicle in the omnidirectional environment of the vehicle awareness system, (2) the current status of a vehicle in the omnidirectional environment of the vehicle awareness system, and (3) a change in the kinetic behavior of the one or more physically detectable elements omnidirectional to the vehicle awareness system. In yet another aspect, the current status of a vehicle in the omnidirectional environment of the primary vehicle may include the vehicle's doors have not been opened since it parked.

In another aspect, the at least one alert devices may include one of (1) an on-board computer coupled to the primary vehicle, (2) a mobile device associated with one or more of the occupants of a vehicle, and (3) a mobile device associated with one or more pedestrians. In yet another aspect, the one or more alert systems may be further configured to generate an alert by selecting one or more of a visual alert, an audio alert, and a haptic alert.

In another aspect, the one or more processors may be further configured to analyze the omnidirectional environment data by analyzing the kinematic information of a vehicle to generate a predicted route for the vehicle. In yet another aspect, the one or more transceivers may acquire the omnidirectional data over a wireless network from a third-party.

ADDITIONAL CONSIDERATIONS

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f). The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers" or the like.

The invention claimed is:

1. A computer-implemented method for improving vehicle safety, the method comprising:
   acquiring, by one or more transceivers communicatively coupled to a vehicle awareness system, omnidirectional environment data from one or more transceivers, where the omnidirectional environment data represents kinetic information on one or more physically detectable elements omnidirectional to the vehicle awareness system, and where at least one of the one or more transceivers are not physically coupled to the vehicle awareness system;
   analyzing, via one or more processors, the omnidirectional environment data to detect one or more hazards in the omnidirectional environment data, wherein one hazard includes an autonomous or semi-autonomous feature of a vehicle in the omnidirectional environment of the vehicle awareness system;
   generating, via the one or more processors, an alert in response to detecting the one or more hazards; and
   transmitting, via the one or more processors and/or associated transceivers, the alert to at least one alert device.

2. The method of claim 1, where one or more of the transceivers are communicatively coupled to one or more peripheral vehicles, where the one or more peripheral vehicles is adjacent to the vehicle awareness system.

3. The method of claim 1, where one or more of the transceivers are communicatively coupled to one or more pedestrians, where the one or more pedestrians is adjacent to the vehicle awareness system.

4. The method of claim 1, where one or more of the transceivers are communicatively coupled to one or more physical structures, where the one or more physical structures is adjacent to the vehicle awareness system.

5. The method of claim 1, where the one or more hazards indicate at least one of (1) the current status of a vehicle in the omnidirectional environment of the vehicle awareness system and (2) a change in the kinetic behavior of the one or more physically detectable elements omnidirectional to the vehicle awareness system.

6. The method of claim 5, where the current status of a vehicle in the omnidirectional environment of the vehicle awareness system includes the vehicle's doors have not been opened since it parked.

7. The method of claim 1, where the at least one alert devices is one of (1) an on-board computer coupled to the vehicle awareness system, (2) a mobile device associated with one or more of the occupants of a vehicle, and (3) a mobile device associated with one or more pedestrians.

8. The method of claim 1, where generating an alert includes selecting one or more of a visual alert, an audio alert, and a haptic alert.

9. The method of claim 1, where analyzing the omnidirectional environment data to detect one or more hazards further includes analyzing the kinematic information of a vehicle to generate a predicted route for the vehicle.

10. The method of claim 1, where the omnidirectional environment data is acquired over a wireless network from a third-party.

11. A system configured to improve vehicle safety including:
   one or more transceivers, communicatively coupled to a vehicle awareness system, configured to acquire omnidirectional environment data, where the omnidirectional environment data represents kinetic information on one or more physically detectable elements omnidirectional to the vehicle awareness system, and where at least one of the one or more transceivers are not physically coupled to the vehicle awareness system;
   one or more processors configured to analyze the omnidirectional environment data, where the one or more processors is configured to detect one or more hazards in the omnidirectional environment data, wherein one hazard includes an autonomous or semi-autonomous feature of a vehicle in the omnidirectional environment of the vehicle awareness system; and
   one or more alert systems configured to generate an alert in response to the one or more processors detecting the one or more hazards, and configured to transmit the alert to at least one alert device.

12. The system of claim 11, where the one or more of the transceivers are communicatively coupled to one or more peripheral vehicles, where the one or more peripheral vehicles is adjacent to the vehicle awareness system.

13. The system of claim 11, where the one or more of the transceivers are communicatively coupled to one or more pedestrians, where the one or more pedestrians is adjacent to the vehicle awareness system.

14. The system of claim 11, where the one or more of the transceivers are communicatively coupled to one or more physical structures, where the one or more physical structures is adjacent to the vehicle awareness system.

15. The system of claim 11, where the one or more hazards indicate at least one of (1) the current status of a vehicle in the omnidirectional environment of the vehicle awareness system and (2) a change in the kinetic behavior of the one or more physically detectable elements omnidirectional to the vehicle awareness system.

16. The system of claim 15, where the current status of a vehicle in the omnidirectional environment of the vehicle awareness system includes the vehicle's doors have not been opened since it parked.

17. The system of claim 11, where the at least one alert devices is one of (1) an on-board computer coupled to the vehicle awareness system, (2) a mobile device associated with one or more of the occupants of a vehicle, and (3) a mobile device associated with one or more pedestrians.

18. The system of claim 11, where the one or more alert systems are further configured to generate an alert by selecting one or more of a visual alert, an audio alert, and a haptic alert.

19. The system of claim 11, where the one or more processors are further configured to analyze the omnidirectional environment data by analyzing the kinematic information of a vehicle to generate a predicted route for the vehicle.

20. The system of claim 11, where the one or more transceivers acquire the omnidirectional data over a wireless network from a third-party.

* * * * *